(12) United States Patent
Shimazaki et al.

(10) Patent No.: US 7,032,234 B2
(45) Date of Patent: Apr. 18, 2006

(54) CARTRIDGE AND DRIVE UNIT FOR PREVENTING ERRONEOUS INSERTIONS OF THE CARTRIDGE

(75) Inventors: Katsusuki Shimazaki, Ibaraki (JP); Shiro Hayashi, Ibraraki (JP); Satoshi Yamagata, Ibaraki (JP)

(73) Assignee: Hitachi Maxwell, Ltd., Osaka (JP)

( * ) Notice: Subject to any disclaimer, the term of this patent is extended or adjusted under 35 U.S.C. 154(b) by 6 days.

(21) Appl. No.: 09/962,091

(22) Filed: Sep. 26, 2001

(65) Prior Publication Data

US 2002/0060969 A1   May 23, 2002

(30) Foreign Application Priority Data

Sep. 26, 2000 (JP) .............................. 2000-292181
Sep. 21, 2001 (JP) .............................. 2001-289107

(51) Int. Cl.
*G11B 23/03* (2006.01)
(52) U.S. Cl. ..................... 720/728; 720/647; 360/133
(58) Field of Classification Search ............... 369/77.1, 369/77.2; 360/94, 99.02, 99.06, 133; 720/725, 720/728, 730, 646, 647
See application file for complete search history.

(56) References Cited

U.S. PATENT DOCUMENTS

| | | | |
|---|---|---|---|
| 5,196,972 A * | 3/1993 | Matsumaru et al. .......... 360/94 |
| 5,386,329 A * | 1/1995 | Ikegawa ........................ 360/94 |
| 5,530,691 A * | 6/1996 | Fujisawa ..................... 369/291 |
| 5,629,819 A * | 5/1997 | Kitano ..................... 360/99.02 |
| 5,748,420 A * | 5/1998 | Ko et al. ..................... 360/133 |
| 6,118,619 A * | 9/2000 | Kabasawa ................ 360/99.06 |
| 6,122,142 A * | 9/2000 | Kabasawa ................ 360/99.06 |
| 6,154,338 A * | 11/2000 | Sasaki et al. ............ 360/99.06 |
| 6,175,468 B1 * | 1/2001 | Koizumi et al. ............... 360/94 |
| 6,175,471 B1 * | 1/2001 | Meguro ....................... 360/133 |
| 6,185,070 B1 * | 2/2001 | Kumagai ..................... 360/133 |
| 6,205,001 B1 * | 3/2001 | Vanderheyden et al. .... 360/132 |
| 6,222,810 B1 * | 4/2001 | Kang et al. ................. 369/77.1 |
| 6,234,845 B1 * | 5/2001 | Hakozaki ..................... 439/633 |
| 6,275,355 B1 * | 8/2001 | Oishi ........................ 360/133 |
| 6,344,945 B1 * | 2/2002 | Ariyoshi ................. 360/99.06 |
| 6,404,720 B1 * | 6/2002 | Inoue ........................ 369/77.2 |
| 6,456,456 B1 * | 9/2002 | Romig et al. ............ 360/99.02 |
| 6,459,544 B1 * | 10/2002 | Harper ....................... 360/133 |
| 6,491,227 B1 * | 12/2002 | Izumi et al. ................ 235/487 |
| 6,511,350 B1 * | 1/2003 | Ito et al. ..................... 439/680 |

FOREIGN PATENT DOCUMENTS

JP         06068589 A  *  3/1994

* cited by examiner

*Primary Examiner*—Brian E. Miller
(74) *Attorney, Agent, or Firm*—Birch, Stewart, Kolasch & Birch, LLP

(57) ABSTRACT

A cartridge and a drive unit that drives a cartridge and has an insertion opening into which the cartridge is inserted are provided. The drive unit includes a shutter which opens and closes the insertion opening, and a mechanism for locking a close state of the shutter so as to prohibit a different type of cartridge and the cartridge not facing a predetermined direction from proceeding to an inside of the drive unit, and for unlocking the close state so as to allow the shutter to proceed to the inside of the drive unit. The cartridge includes an unlock member that unlocks the close state of the shutter in cooperation with the mechanism.

7 Claims, 29 Drawing Sheets

(a)

(b)

(c)

(d)

(e)

(f)

(a)

(b)

(c)

(d)

(a)

(b)

(c)

(d)

(a)

(b)

(a)

(b)

(a)

(b)

(a)

(b)

(a)

(b)

(c)

(d)

(a)

(b)

(c)

(d)

(a)

(b)

(c)

(d)

(a)

(b)

(c)

(d)

(e)

(a)

(b)

(a)

(b)

(a)

(b)

CARTRIDGE AND DRIVE UNIT FOR PREVENTING ERRONEOUS INSERTIONS OF THE CARTRIDGE

BACKGROUND OF THE INVENTION

The present invention relates generally to a cartridge and a drive unit into which the cartridge is inserted, and more particularly to a prevention of erroneous insertions of the cartridge. Also, the present invention is broadly applicable to the prevention of erroneous insertions of a unit when the unit is inserted into an electronic apparatus for accommodating the unit.

Here, the "erroneous insertion" means that the cartridge is not inserted properly or the cartridge is inserted in a direction other than a predetermined direction, and conceptually includes not only that a type of the cartridge is not proper (e.g., where a type, shape, or size of a medium stored in the cartridge is not proper, and where the cartridge is not original manufacturer's product), but also that cartridge's orientation is not proper (e.g., where the cartridge is inserted back to front and upside down).

Along with the recent spread of multimedia, optical information recorders have attracted attentions, which record a large volume of data with a high density and reproduce them at a fast speed. These optical information recorders may use ROM type disks, such as a CD and a laser disk, that are stamped with information when made, write once type disks, such as a CD-R, that are recordable only once, and RAM type disks that may rewrite and delete data any number of times using a magneto optical recording or a phase change recording. Among these optical information recorders, magneto optical recorders are used in such a field that requires a high transfer rate.

These various optical information-recording disks demand various types of magneto optical recorders having a wide variety of mechanisms. For example, it is necessary to arrange the head section properly so as to correspond to a single-side recording arranging a magnetic head at one side and an optical head at the other side, and a double-side recording arranging optical and magnetic heads at both sides. It is also necessary for the disk cartridge to prepare various types of disk cartridges so as to change a shape of a head insertion portion.

As discussed above, if a new disk cartridge and/or disk drive are created whenever a system having a new function is developed, problems occur in compatibility among disk drives for various disk cartridges and prevention of erroneous insertions.

Therefore, each manufacturer has recently exercised its ingenuity so as to make the system having a new mechanism applicable as it is to the existing system, specifically, by using the same-sized disk cartridge that accommodates a disk with high capacity for existing low-capacity information recorder systems.

In this case, it is necessary for the existing disk cartridge and its drive unit to prepare new disks and information recorders and to prevent erroneous insertions of the disk cartridge so as to solve the compatibility problem.

One of conventional erroneous-insertion-preventing mechanisms keeps unchanged a disk cartridge structure and a disk shape etc., and records an identification mark onto the disk for identification purposes: Then, the drive unit reads the identification mark, identifies an attribute of the disk, and takes a proper step for the disk, such as displaying a disk type and automatically ejecting it if it is not a proper type.

Another way is to form an identification hole, etc. directly into the disk cartridge: The drive unit then identifies the hole in a mechanical or optical manner, and takes a similar step for the disk depending upon the presence of the hole.

On the other hand, an alternative means for preventing erroneous insertions into the drive unit is a direct change of the disk cartridge shape. One example of disk cartridge disclosed in Japanese Laid-Open Patent Application No. 64-30068 attempts to prevent erroneous insertions of a disk cartridge for a 3.5-inch floppy disk and a disk cartridge for an optical disk, respectively, by providing the disk cartridge for the floppy disk with a notch at a front left corner of its case, and the disk cartridge case for the optical disk with a notch at a front right corner of its case, with respect to the insertion direction. Then, the drive unit is also provided with convexes that correspond to these notches in a cartridge holder, into which these respective cartridges are inserted.

PCT/US95/13467 (WO96/12285) discloses a system that provides, in a disk drive, a middle surface on the insertion way of the disk cartridge, and a switch that projects from the middle surface, while providing a disk cartridge with a projection at its front surface. When the projection pushes the switch, the middle surface allows the disk cartridge to proceed to the inside of the disk drive.

However, the manner that keeps unchanged the cartridge structure and the recording medium shape requires, before recognizing any erroneous insertion, the cartridge to be completely inserted or located in the drive unit, and then the drive unit to determine the erroneous insertion. Therefore, it disadvantageously takes a while to determine whether an erroneous insertion occurs.

On the other hand, the manners in the above two references also require the cartridge to be inserted into the drive to determine whether an erroneous insertion occurs. Therefore, problems occur in that the cartridge contacts and damages the head mechanism, a disk shutter opening/closing arm, etc. in the drive unit during the insertion of the cartridge. In particular, when a user does not recognize the erroneous insertion and compulsorily shoves the cartridge into the drive unit, the cartridge and the drive unit may possibly get damaged. Moreover, there occurs a problem that the cartridge cannot be ejected from the disk drive after erroneously inserted into the disk drive.

BRIEF SUMMARY OF THE INVENTION

Accordingly, it is an exemplified object of the present invention to provide a cartridge, its drive unit, and a system including them that promptly determines the fitness of the cartridge to the drive unit, prevents erroneous insertions of the cartridge, and protecting the cartridge and the drive unit from getting damaged.

In order to achieve the above object, there are provided a cartridge of one aspect of the present invention for accommodating an information recording medium to be driven by a drive unit that has an insertion opening into which the cartridge is inserted, the drive unit including a shutter which opens and closes the insertion opening, and a mechanism for locking a close state of the shutter so as to prohibit a different type of cartridge and the cartridge not facing a predetermined direction from proceeding to an inside of the drive unit, and for unlocking the close state so as to allow the cartridge to proceed to the inside of the drive unit, the cartridge including a unlock member which unlocks the close state of the shutter in cooperation with the mechanism.

The drive unit and a system including the cartridge and the drive unit also constitute other aspects of the present invention.

According to the inventive cartridge and drive unit, unless a regular cartridge is inserted in a proper manner, the shutter never opens and any cartridge cannot proceed to the inside of the drive unit. Therefore, erroneous insertions are detectable before the cartridge is inserted into the inside of the drive unit.

In the instant application, the "cartridge" broadly covers a vessel that houses an information recording medium to be driven by the drive unit, irrespective of its name and shape, such as a cartridge, case, housing, card, and stick, and includes, for instance, a disk, a tape, a semiconductor memory, etc. Therefore, such a cartridge covers a disk cartridge, an IC card, an IC tag, a memory card for use with a game machine, and a video tape cartridge. Also, in the instant application, the "IC card" generalizes a smart card, an intelligent card, a chip-in card, a microcircuit, a (microcomputer) card, a memory card, a super card, a multifunctional card, a combination card, etc. The "IC tag" exhibits similar functions to the IC card, and covers all the information recording media which have the same or smaller size as a stamp size and coin shape, etc. The "drive unit" broadly covers apparatuses that drive a cartridge, such as a disk drive, an IC card reader/writer, a game machine, a video player, and a MD player. The "shutter" broadly covers, irrespective of its name, a gate, a lid, a guard, etc.

The cartridge may further include a front surface that is first inserted into the insertion opening, and the unlock member includes a projection that protrudes from the front surface in an insertion direction of the cartridge into the drive unit. Such a projection serves as a key to release a lock. Although it is conceivable to respectively form the front surface and the shutter as a unique shape in its thickness direction, this would thicken the cartridge and it would be difficult to apply this method to the cartridge that has been required to be made thin. Accordingly, the projection is formed ahead from the front surface of the cartridge to prevent the cartridge thick while unlocking the shutter by a simple structure.

The front surface may include convex, concave, and curved portions. Correspondingly, the shutter may be provided with convex, concave, and curved portions to serve as an unlocking key. The unlock member includes a plurality of projections symmetrically with respect to a centerline of the cartridge parallel to the insertion direction. When the cartridge is pressed against the shutter, approximately symmetrical forces apply onto the shutter without deforming or damaging the shutter. For the similar reason, it is preferable that the projection is provided at a center part of the front surface or the unlock member includes a plurality of projections on the front surface.

The front surface may include at least one axis of symmetry when the cartridge is viewed from a front of the cartridge, and the unlock member includes a projection located approximately symmetrically with respect to the axis of symmetry, wherein a shape of the front surface may be different from that of the front surface rotated by 180°. Since the projection is located approximately symmetrically with respect to the axis of symmetry, approximately symmetrical force with respect to the axis of symmetry applies onto the shutter without deforming or damaging the shutter when the cartridge is pressed against the shutter. In addition, a shape changing before and after the rotation by 180° of the front surface would prevent an erroneous insertion regarding an orientation of the cartridge, for example, when the cartridge is inserted upside down.

The mechanism may include a lock member that is forced toward said shutter, engageable with said shutter, and movable in a direction orthogonal to the insertion direction of the cartridge into the drive unit. The lock member preferably retreats from a surface of the shutter into the inside of the drive unit. The lock member, if projecting from the surface of the shutter to the outside, may contact a cartridge without the projection: Such a cartridge would possibly unlock the lock member on impact to the cartridge in the insertion direction S, and proceed to the inside of the drive unit.

There is provided a unit according to another aspect of the present invention to be accommodated by an electronic apparatus that has an insertion opening into which the unit is inserted, the electronic apparatus including a proceed blocker which blocks a proceed of the unit through the insertion opening, and a mechanism for setting the proceed blocker to be in a first state so as to prohibit the unit from proceeding to an inside of the electronic apparatus, and for setting the proceed blocker to be in a second state so as to allow the unit to proceed to the inside of the drive unit, the unit including a release part which sets the proceed blocker in the second state. The electronic apparatus and a system including the unit and the electronic apparatus also constitute other aspects of the present invention. This inventive unit, electronic apparatus, and system also realize the similar operations to those of the above cartridge, drive unit, and system.

In the instant application, the "electronic apparatus" covers a device that accommodates a unit, such as a cellular phone, a PHS and other communication devices, a personal computer ("PC" hereinafter) and its peripherals, the above drive unit, a personal digital assistant ("PDA" hereinafter), a television set, a video recorder, a camera, consumer electrical appliances. The "unit" broadly covers a power supply unit, a hard disk unit, other external units, and the above cartridge. The electronic apparatus is not necessarily limited to those which drive a unit, as understood from a power supply unit.

Other objects and further features of the present invention will become readily apparent from the following description of preferred embodiments with reference to accompanying drawings.

DETAILED DESCRIPTION OF THE PREFERRED EMBODIMENTS

A description will now be given of a disk cartridge 100 as an example of the inventive cartridge and unit, and a disk drive 200 as an example of the inventive drive unit and electronic apparatus, with reference to the accompanied drawings.

FIGS. 1–7 show an example of disk cartridge 100 and the disk drive 200 of the present invention.

Figure 1:
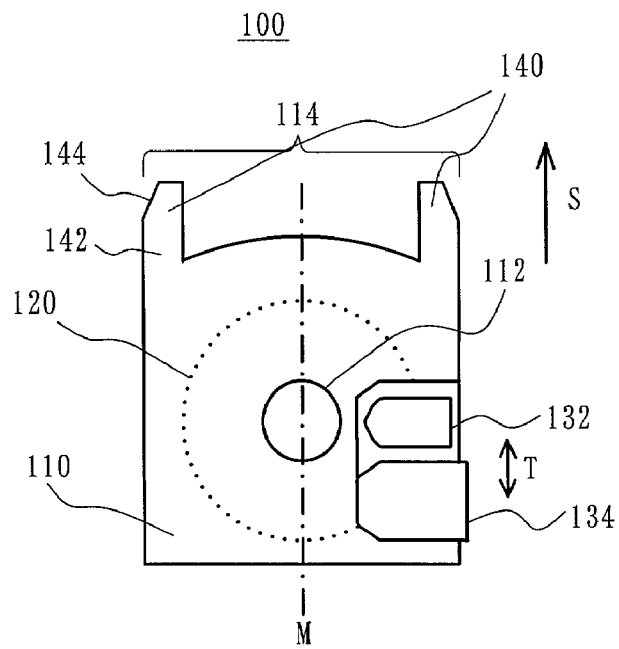
FIG. 1 is a plane view of a disk cartridge of a first embodiment according to the present invention.

FIG. 1 is a plane view of a disk cartridge 100 (at its backside) of a first embodiment according to the present invention. The disk cartridge 100 accommodates a disk 120 in a cartridge case 110, and has, at its center part, an insertion opening 112 for a disk drive shaft that drives the disk 120. Provided at a side of the cartridge case 110 are a head insertion opening 132 and a shutter 134 for opening and closing the head insertion opening 132. The shutter 134 is movable in an arrow direction T, and forced by a spring member (not shown) so as to close the head insertion opening 132. FIG. 1 shows that the shutter 134 is opening. The shutter 134 closes before the disk cartridge 100 is inserted into the disk drive 200. Although this figure shows that only the head insertion opening 132 is structured to be openable, a mechanism may be provided as necessity arises for opening the head insertion hole 132 and the disk-drive-shaft insertion opening 112 at the same time.

The cartridge case 110 is made from an arbitrary material, such as ABS and polycarbonate resin, which have been used as a material for the cartridge, as well as a composition formed by dispersing and mixing heatproof materials, such as styrene resin, nitrogen inclusive resin, and ester resin.

The cartridge 110 has a front surface 114 that is to be first inserted into an insertable opening 204 in the disk drive 200, which will be described later. Formed at both sides on the front surface 114 are a pair of erroneous-insertion-preventing projections 140 which protrude from the front surface 114 in an insertion direction S of the cartridge 100.

As discussed later, the erroneous-insertion-preventing projections 140 serve as a key to unlock (a close state of) a lid or shutter 210 in the insertion opening 204 in the disk drive 200. In other words, the erroneous-insertion-preventing projection 140 is designed to unlock the closed state of the shutter 210 in cooperation with a lock mechanism, which will be described later.

The front surface 114 of the instant embodiment has a rectangular shape when viewed from the front. In order to prevent erroneous insertions of the disk cartridge 100 into the disk drive 200, it is conceivable that the front surface 114 and the insertion opening 204 have a unique shape that serves as a key. However, this would thicken the cartridge 110 and would not be good for the disk cartridges that have recently been required to be made thin. Accordingly, the erroneous-insertion-preventing projection 140 is formed on the cartridge front surface so as to protrude ahead in the insertion direction S, preventing part or all of the cartridge case 110 from becoming thick and precluding erroneous insertions using a simple configuration. Incidentally, as described later, the present invention is applicable even when the front surface 114 has plane and other shapes.

The front surface 114 of the instant embodiment is shaped as a curved surface, illustratively. Although the instant embodiment supplies the function of a key to unlock the shutter 210 with the erroneous-insertion-preventing projection 140 in the disk cartridge 100, together with or instead of this, the shape of the front surface 114 may have such a function if necessary. For example, the shutter 210 is configured to have a (e.g.. concave) curved surface corresponding to the curved surface of the front surface 114, and the shutter 210 is unlocked when the front surface 114 presses the shutter 210 by its entire surface. Of course, the curved surface of the front surface 114 may be configured to the concave shape, while the shutter 210 may have a convex shape.

The erroneous-insertion-preventing projection 140 prevents the erroneous insertions of a different type of cartridge into the disk drive 200. In addition, in the instant embodiment, the erroneous-insertion-preventing projection 140 prevents erroneous insertions of the disk cartridge 100 itself (i.e., when the disk cartridge is inserted front side back and upside down). A detailed description of an operation of the erroneous-insertion-preventing projection 140 will be given with reference to FIG. 2 and subsequent figures.

A pair of erroneous-insertion-preventing projections 140 are provided symmetrically with respect to a centerline M of the cartridge case 110 parallel to the insertion direction S. As a result, when the cartridge case 110 is pressed against the shutter 210 in the disk drive 200, approximately symmetrical forces apply to the shutter 210, preventing deformation and damages of the shutter 210. The present invention is applicable when one erroneous-insertion-preventing projection 140 is provided at a single side, and the shutter lock member 230 is provided at a corresponding single side.

The erroneous-insertion-preventing projection 140 has an approximately rectangular base 142 with a notched corner 144. The notched corner 144 is engageable with an inclined surface 231 on the shutter lock member 230, which will be described with reference to FIG. 2, and converts a force applied in the insertion direction S by a user to the disk cartridge 100 during its insertion into a direction $L_2$ (or a direction $L_1$ for the inclined surface 231 at the other side) orthogonal to the insertion direction S.

A necessary and sufficient length is selected for the erroneous-insertion-preventing projection 140 to unlock the lock member 230. When the projection 140 is too short, the lock member 230 becomes short and accordingly the lock member undesirably would possibly open even for a cartridge without the projection on impact and allow the cartridge to proceed to the inside of the disk drive. The projections 140, if too long, would undesirably make the cartridge large and reduce the mechanical strength of the projection. If necessary, these projections 140 have different shapes and sizes.

The disk cartridge 100 is manufactured by forming upper and lower parts of the cartridge case 100 using polycarbonate resin etc., and injection molding. In this case, an opening corresponding to the head insertion opening 132 and a half of the erroneous-insertion-preventing projection 140 are formed in the upper part, while the disk-drive-shaft insertion opening 112, (an opening corresponding to the head insertion opening 132 when both surfaces are accessed by the heads) and a half of the erroneous-insertion-preventing projection 140 are formed in the lower part. Next the predetermined disk 120 is inserted between the upper and lower parts of the cartridge case 110, and the upper and lower parts are heated and melted together. Thereafter, the shutter part 134 is attached, and the disk cartridge 100 is completed.

Figure 2:
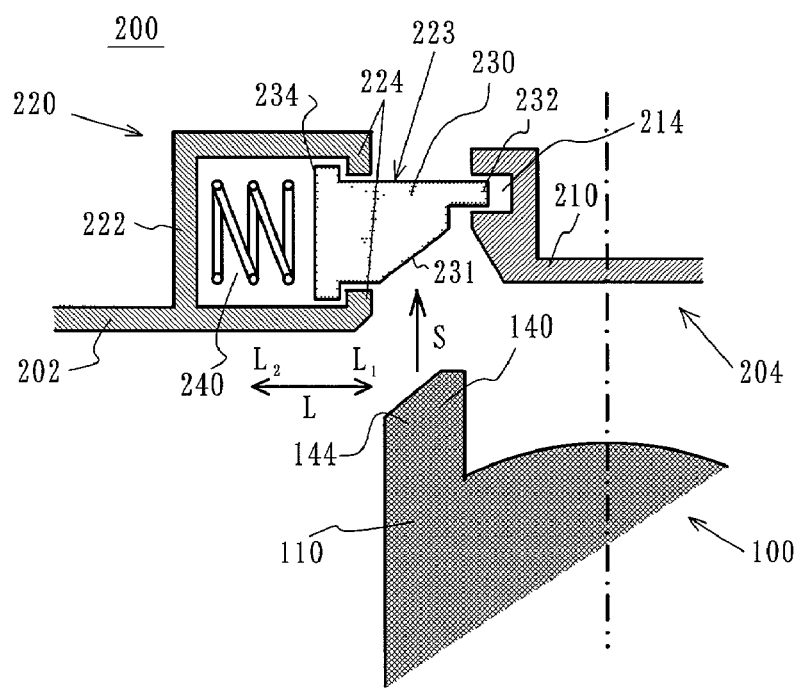
FIG. 2 is a partial enlarged sectional view of a state before the disk cartridge shown in FIG. 1 is inserted into a disk drive.
Figure 3:
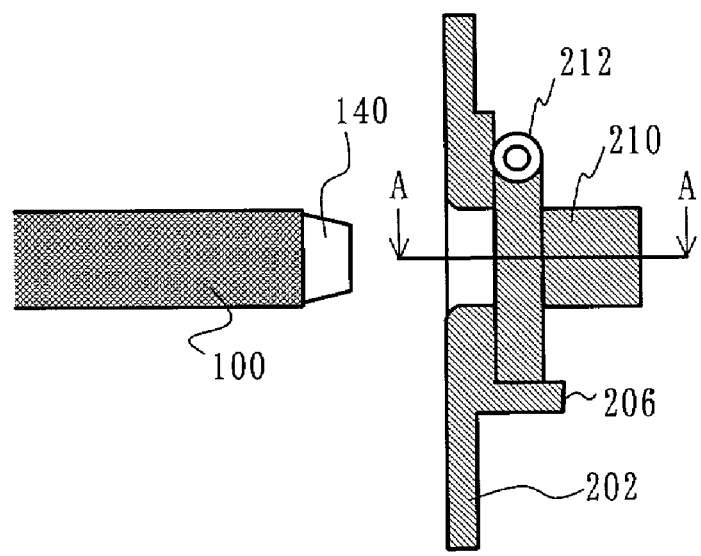
FIG. 3 is a lateral sectional view of FIG. 2.

FIG. 2 is a detailed view of a disk-cartridge insertion part 202 on the disk drive 200, and shows a state before the disk cartridge is inserted into the disk drive 200. FIG. 3 is a view of FIG. 2 viewed from its side.

As shown in FIG. 2, the insertion opening 204 is formed in the disk-cartridge insertion part 202, through which the disk cartridge 100 is inserted into the disk drive 200, and the shutter 210 is provided in the insertion opening 204. At both sides of the shutter 210, a lock mechanism 220 is provided for preventing erroneous insertions of the cartridge.

Although the surface of the shutter 210 is not necessarily located at the same position as the surface of the insertion opening 204, the shutter 210 needs to be provided near the insertion opening 204 to protect the components in the disk drive 200. This is because the present invention attempts to prevent erroneous insertions of the cartridge into the drive unit, and resultant damages of components in the drive unit and jamming of the cartridge.

The lock mechanism 220 includes, in a housing 222, a shutter lock member 230 movable in a direction L, which locks and unlocks the shutter 210, and a spring 240 which forces the shutter lock member 230 in the direction $L_1$ (or the direction $L_2$ for the inclined surface 231 at the other side). The spring 240 comprises, for example, a compression spring.

As shown in FIG. 2, the lock member 230 retreats from the surface of the shutter 210 into the inside of the disk drive 200. The lock member 230, if projecting from the surface of the shutter to the outside, may contact such a cartridge as does not have the projection: Such a cartridge would possibly unlock the lock member 230 on impact to the cartridge in the insertion direction S, and proceed to the inside of the drive unit 230.

The housing 222 has a hole 223 for movements of the shutter lock member 230. The housing 222 also includes a stretch portion 234 that stretches out around the hole 223 and engages with an anchor 234 of the shutter lock member 230, which will be described later. The contour of the housing 222 is not limited to a specific shape, but may have a cylindrical shape, a rectangular parallelepiped shape, and any other shapes.

Figure 4:
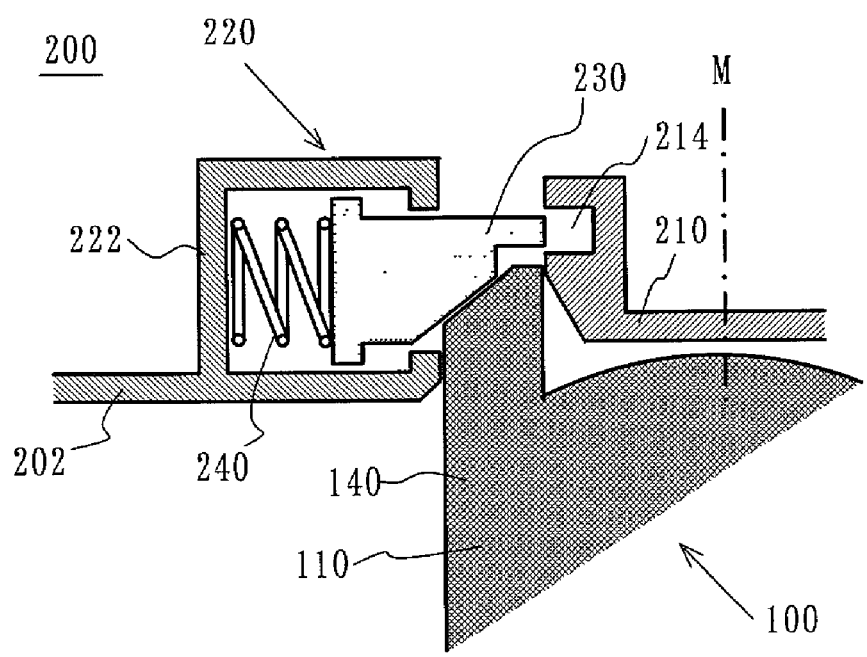
FIG. 4 is a partial enlarged sectional view of a state where the disk cartridge shown in FIG. 1 unlocks a shutter in the disk drive.

As shown in FIG. 3, the shutter 210 illustratively has a approximately T shape in this embodiment, but it is not limited to this shape as far as it blocks cartridge's proceed. The shutter 210 is rotatably supported around a support shaft 212 inside the disk drive 200, and has, as shown in FIGS. 2 and 4, a hole 214 engageable with the shutter lock member 230. The support shaft 212 of the shutter 210 is connected to a forcing member (not shown), such as a spring, which forces the shutter 210 in the close direction (i.e., clockwise in FIGS. 3 and 5). In FIG. 3, the bottom of the shutter 210 is engaged with the projection 206 from the insertion part 202, but such an engagement secures the rotation without a hitch. Before the disk cartridge 100 is inserted, the shutter 210 cannot open because it is always locked by the shutter lock member 230.

The shutter 210 shown in FIG. 2 corresponds to a section taken along a line A—A in FIG. 3. A shape of the hole 214 corresponds to a protrusion 232 of the shutter lock member 230: The hole 214 has an arbitrary shape, such as a cylinder, a rectangular parallelepiped, etc. As shown in FIG. 2 and FIG. 4 which will be described later, the shutter lock member 230 has an approximately T shape, and includes the inclined surface 231, the protrusion 232, and an anchor 234. The inclined surface 234 is engageable with the notched corner 144 of the disk cartridge 100, as discussed above. The inclined surface 231 may be formed at a cylindrical surface, a rectangular column surface, and other surfaces; the member including the inclined surface 231 has a cylindrical shape, a rectangular column shape, etc. The protrusion 232 fits in the hole 214 in the shutter 210. The protrusion 232 has a cylindrical shape, a rectangular parallelepiped shape, or the like corresponding to the shape of the hole 214. The anchor 234 is engaged with the spring 240, and anchored by the stretch portion 224 in the housing 222. The anchor 234 has a cylindrical shape, a rectangular column shape, or the like corresponding to the stretch portion 234.

Figure 5:
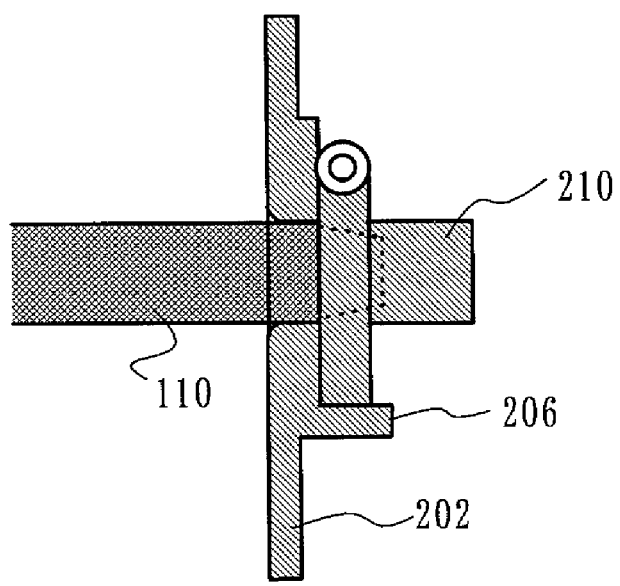
FIG. 5 is a lateral sectional view of FIG. 4.

FIG. 4 shows a state where the erroneous-insertion-preventing projections 140 of the cartridge case 110 push out the shutter lock members 230, unlocking the shutter 210. FIG. 5 is a view of FIG. 4 viewed from its side. In FIG. 4, the erroneous-insertion-preventing projections 140 have unlocked the shutter lock members 230, and the shutter 210 is ready to open.

Figure 6:
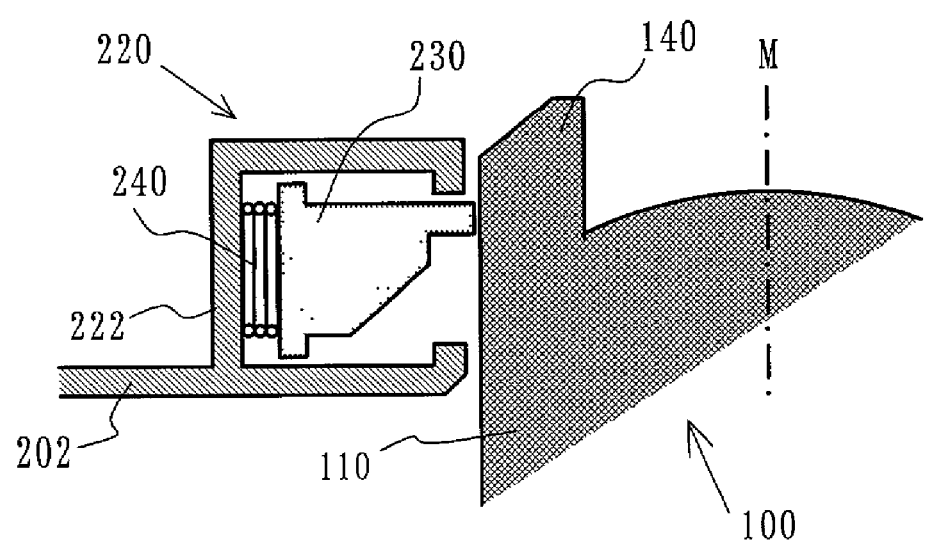
FIG. 6 is a partial enlarged sectional view of a state where the disk cartridge shown in FIG. 1 opens the shutter and proceeds to the inside of the disk drive.
Figure 7:
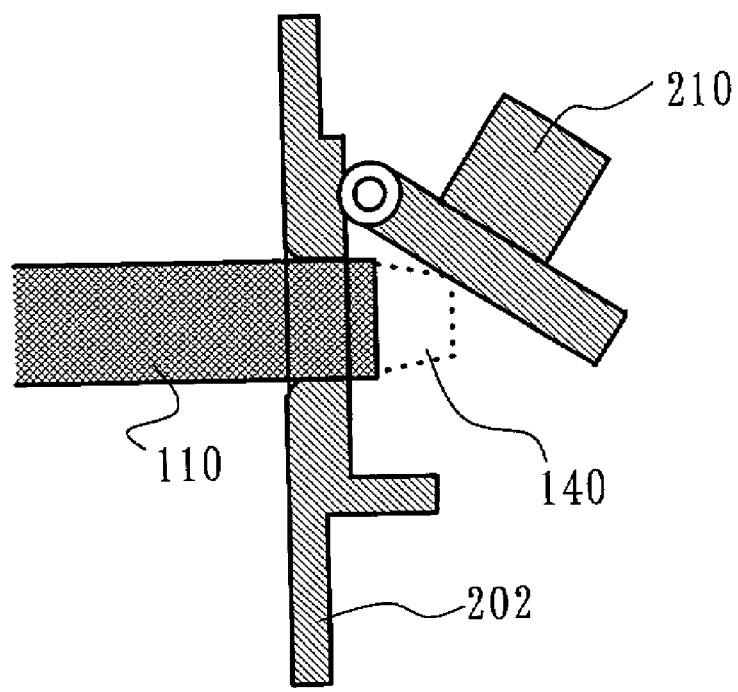
FIG. 7 is a lateral sectional view of FIG. 6.

FIG. 6 is a sectional view showing a state where a top of the disk cartridge 100 proceeds to the inside of the disk drive 200 through an opening shutter 210. FIG. 7 is a view of FIG. 6 viewed from the side. In this state, the shutter lock member 230 goes away from the shutter 210, as shown in FIG. 6, the shutter 210 opens, and the disk cartridge 100 is ready to be inserted into the inside of the disk drive 200.

Unlike the instant embodiment, a cartridge that does not have the erroneous-insertion-preventing projections 140 on the cartridge case 110 cannot unlock the shutter lock part 230, or proceed to the inside of the disk drive 200. Thereby, this would realize a prevention of erroneous insertions of a disk cartridge. More specifically, the instant embodiment may prevent erroneous insertions of different types of disk cartridges, and effectively prevent erroneous insertions of disk cartridges with the same size or smaller size which facilitate erroneous insertions. The instant embodiment may also prevent erroneous insertions of even the disk cartridge 100 when the disk cartridge 100 is not inserted from the front surface 114 (e.g., when it is inserted with the rear surface front.)

Although the instant embodiment provides both sides of the front surface 114 of the cartridge case 110 with the erroneous-insertion-preventing projections 140, the present invention is not limited to this configuration. Rather, the erroneous-insertion-preventing projection(s) 140 may be provided at the center part or on upper and lower surfaces in the thickness direction. One of the objects of the present invention may be achieved by providing the shutter lock member at a corresponding portion in the disk drive.

Figure 8:
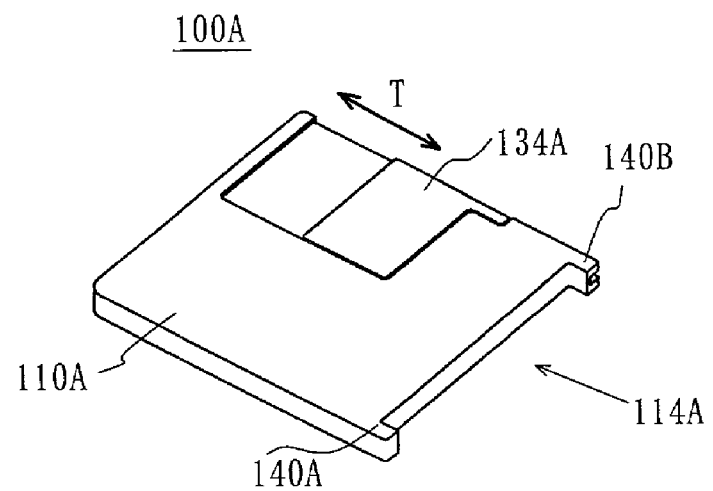
FIG. 8 is perspective, front and plane views of a disk cartridge of a second embodiment according to the present invention.
Figure 8:
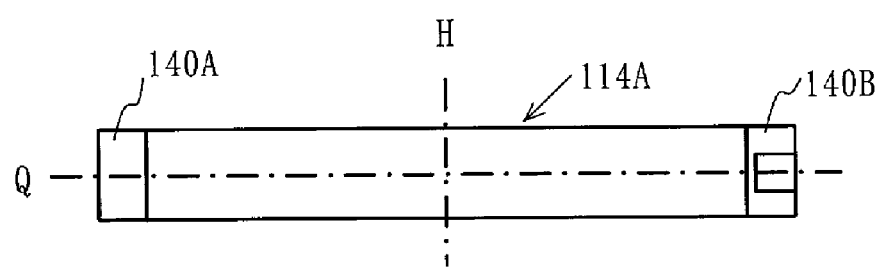
Figure 8:
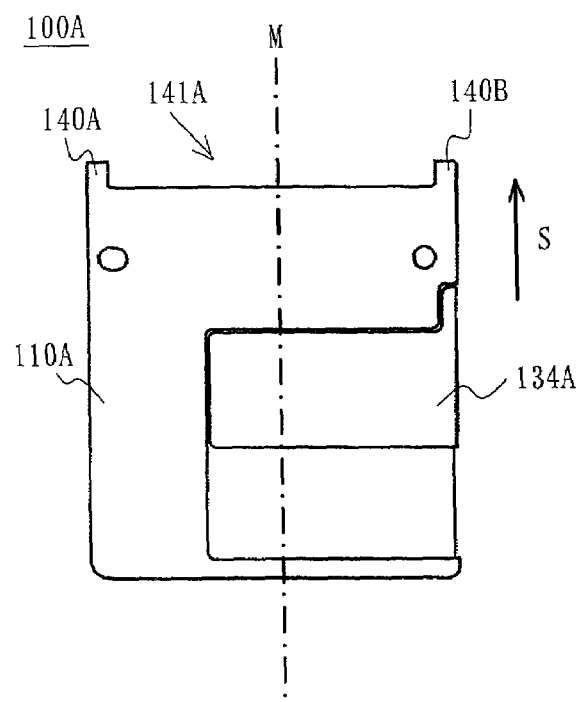
Figure 8:
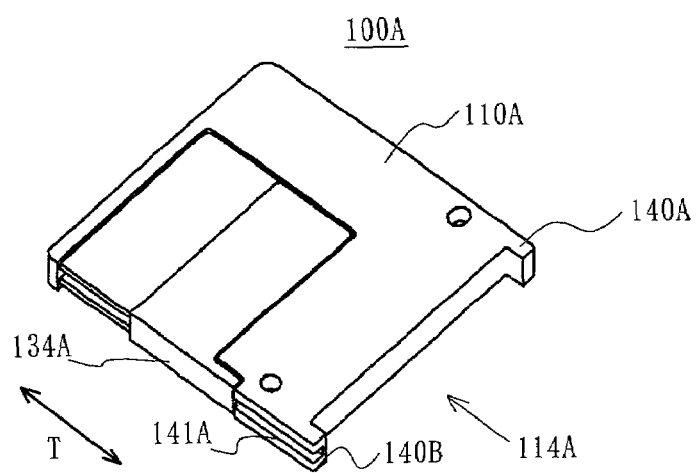
Figure 8:
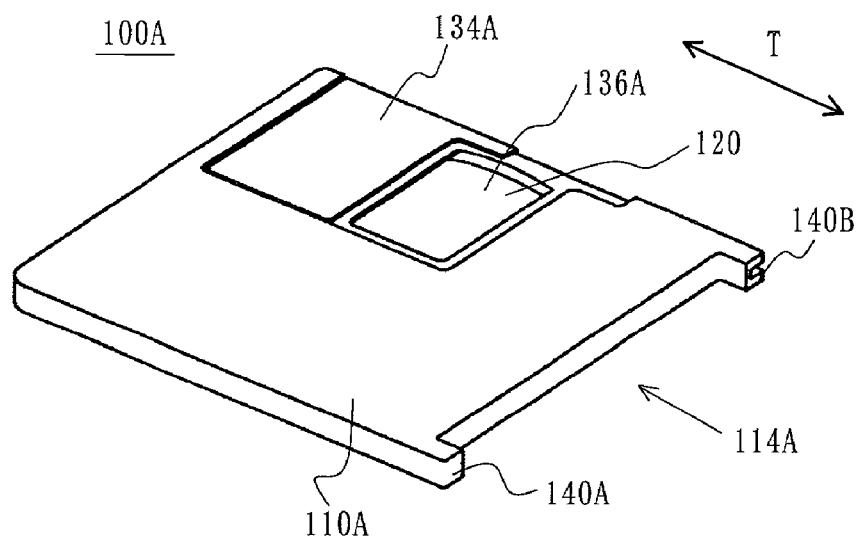
Figure 8:
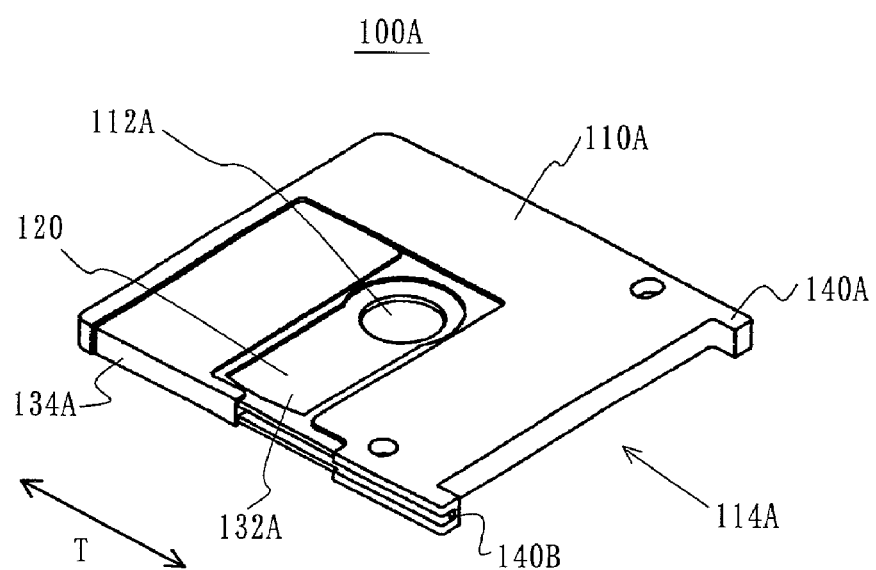

A description will now be given of a disk cartridge 100A of a second embodiment according to the present invention, with reference to FIG. 8. Here, FIG. 8(a) is a perspective view of an external appearance of the disk cartridge 100A at its front side with a shutter 134A closed. FIG. 8(b) is a front view of the disk cartridge 100A. FIG. 8(c) is a plane view of the disk cartridge 100A at its backside. FIG. 8(d) is a perspective view of an external appearance of the disk cartridge 100A at the backside shown in FIG. 8(a). FIG. 8(e) is a perspective view of an external appearance of the disk cartridge 100A at its front side with the shutter 134 open. FIG. 8(f) is a perspective view of an external appearance of the disk cartridge 100A shown in FIG. 8(e) at its backside.

The disk cartridge 100A includes a pair of different shaped projections 140A and 140B at both sides of a front surface 114A of a cartridge case (or shell) 110A. The projection 140A is different from the projection 140B in that the projection 140B has a groove 141A at its center along the insertion direction S. The groove 141A is connected to a groove along which the shutter 134A, which will be described later, moves.

Referring to FIG. 8(b), the projections 140A and 140B are located at approximately symmetrical positions with respect to each of axes of symmetry Q and H of the front surface 114A (or with respect to the centerline M shown in FIG. 8(c)). Thereby, when the cartridge 100A is pressed against a shutter (not shown) in a disk drive (not shown), symmetrical forces with respect to the axes of symmetry Q and H apply to the shutter without causing deformation and damages of the shutter. In addition, a shape of the front surface 114A is different from that rotated by 180° due to the groove 141A, whereby the cartridge 100A is prevented from being erroneously inserted upside down into the inside of the disk drive (not shown).

A necessary and sufficient length is selected for these projections 140A and 140B to unlock the lock member (not shown): When the projection is too short, the lock member becomes short accordingly; the lock member undesirably would possibly open even for a cartridge without the projection on impact and allow the cartridge to proceed to the inside of the disk drive. The projection if being too long would undesirably make the cartridge large and reduce the mechanical strength of the projection. If necessary, these projections 140A and 140B have different shapes and sizes.

The disk cartridge 100A has a shutter 134A different from the shutter 134 shown in FIG. 1. The shutter 134A is different from the shutter 134 in that it opens the disk-drive-shaft insertion opening 112 and the head insertion opening 132 at the same time.

FIGS. 8(a) and 8(b) show a state where the shutter 134A closes, while FIGS. 8(e) and 8(f) show a state where the shutter 134A opens. When the shutter 134A opens, the head insertion opening 136A opens, as shown in FIG. 8(e), and the disk-drive-shaft insertion opening 112A and the head insertion opening 132A open, as shown in FIG. 8(f). When the shutter 134A opens, heads (not shown) may access to both sides of the disk 120 through the head insertion openings 132A and 136A, while the disk drive shaft (or spindle shaft) is ready to rotate the disk 120 through the insertion opening 112A.

Although the front surface 114A of the disk cartridge 100A is different from the front surface 114 in that the front surface 114A has a plane portion, the instant embodiment does not use this plane shape for unlock and other purposes.

Figure 9:
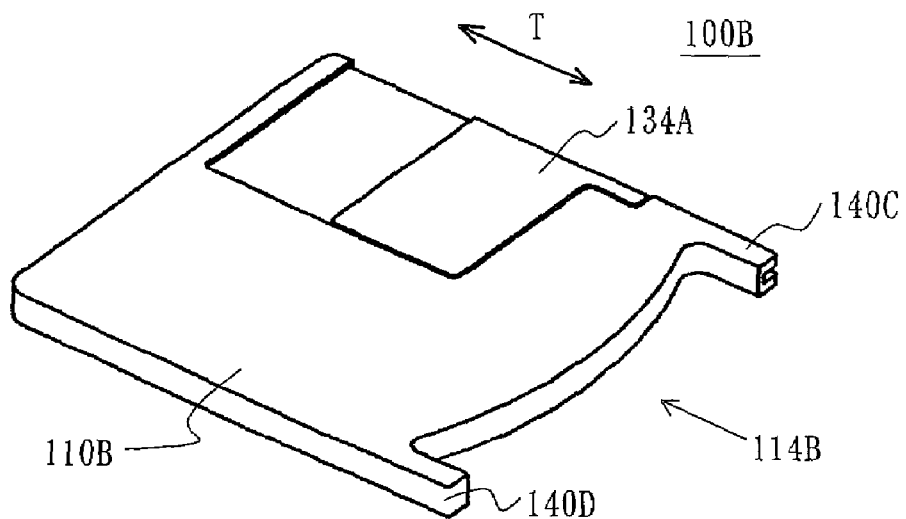
FIG. 9 is perspective, front and plane views of a disk cartridge of a third embodiment according to the present invention.
Figure 9:
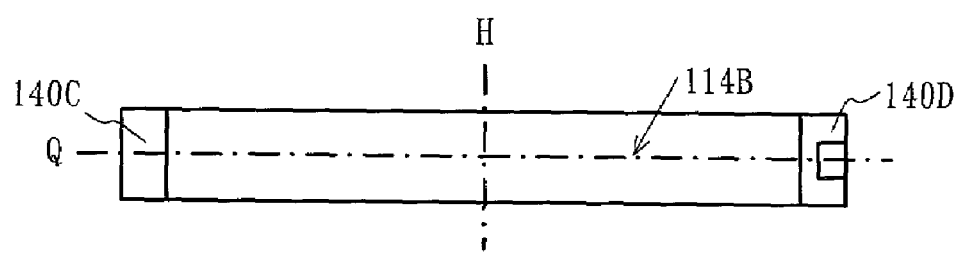
Figure 9:
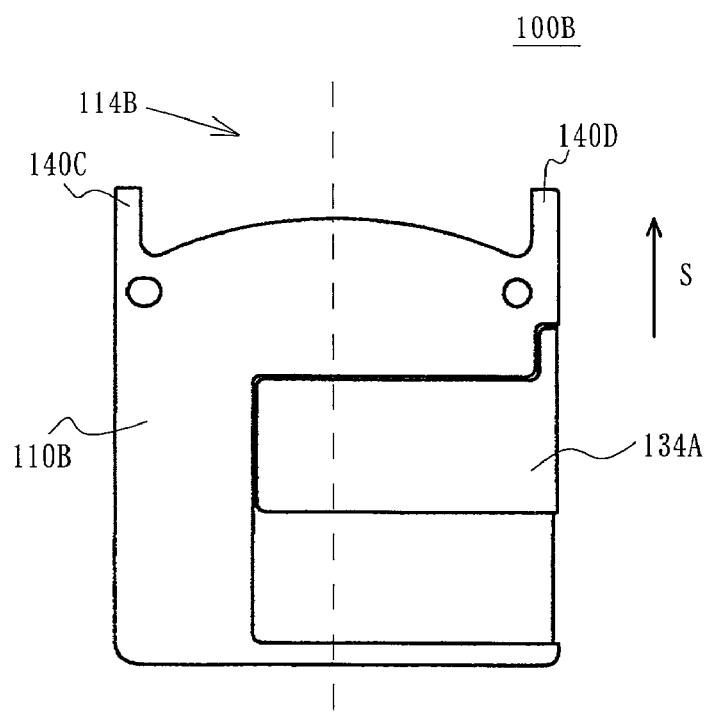
Figure 9:
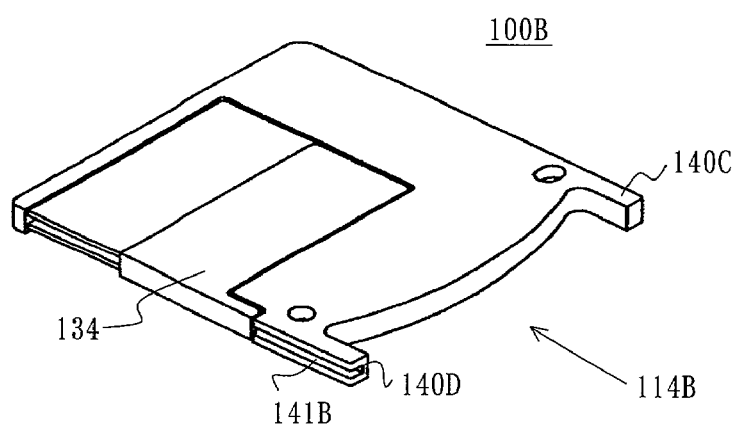

A description will now be given of a disk cartridge 100B of a third embodiment according to the present invention, with reference to FIG. 9. Here, FIG. 9(a) is a perspective view of an external appearance of the disk cartridge 100B at its front side. FIG. 9(b) is a front view of the disk cartridge 100B. FIG. 9(c) is a plane view of the disk cartridge 100B at its backside. FIG. 9(d) is a perspective view of an external appearance of the disk cartridge 100B at its backside.

The disk cartridge 100B includes a pair of different shaped projections 140C and 140D at both sides of a front surface 114B of a cartridge case (or shell) 110B. The projection 140C is different from the projection 140D in that the projection 140D has a groove 141B at its center along the insertion direction S. The groove 141B is connected to a groove along which the shutter 134A moves.

Referring to FIG. 9(b), the projections 140C and 140D are located at approximately symmetrical positions with respect to each of axes of symmetry Q and H of the front surface 114B. Thereby, when the cartridge 100A is pressed against a shutter (not shown) in a disk drive (not shown), symmetrical forces with respect to the axes of symmetry Q and H apply to the shutter without causing deformation and damages of the shutter. In addition, a shape of the front surface 114B is different from that rotated by 180° due to the groove 141B, whereby the cartridge 100B is prevented from being erroneously inserted upside down into the inside of the disk drive (not shown).

A necessary and sufficient length is selected for these projections 140C and 140D to unlock the lock member (not shown): When the projection is too short, the lock member becomes short accordingly; the lock member undesirably would possibly open even for a cartridge without the projection on impact and allow the cartridge to proceed to the inside of the disk drive. The projection if being too long would undesirably grow the cartridge large and reduce the mechanical strength of the projection. If necessary, these projections 140C and 140D have different shapes and sizes.

Although the front surface 114B of the disk cartridge 100B has a curved portion similar to the front surface 114, the instant embodiment does not use this curved surface shape for unlock and other purposes.

Figure 10:
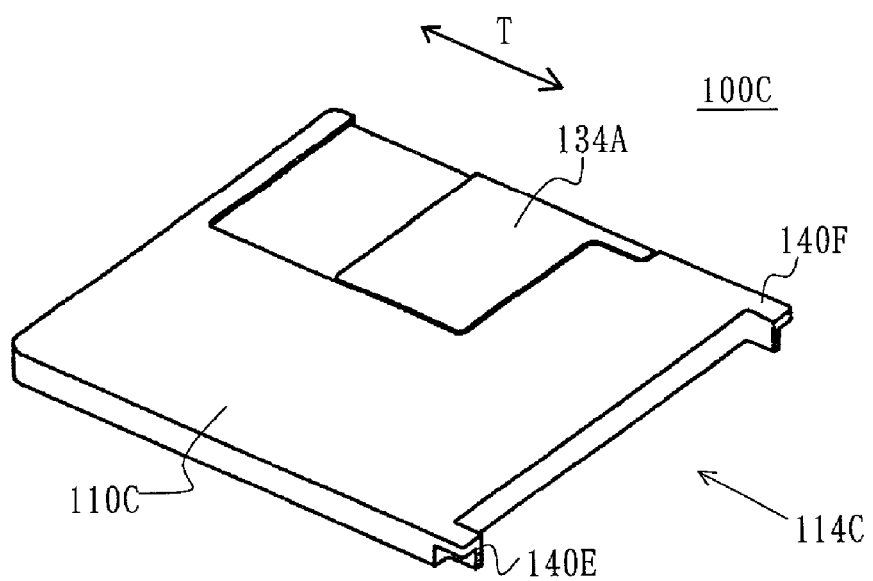
FIG. 10 is perspective, front and plane views of a disk cartridge of a fourth embodiment according to the present invention.
Figure 10:
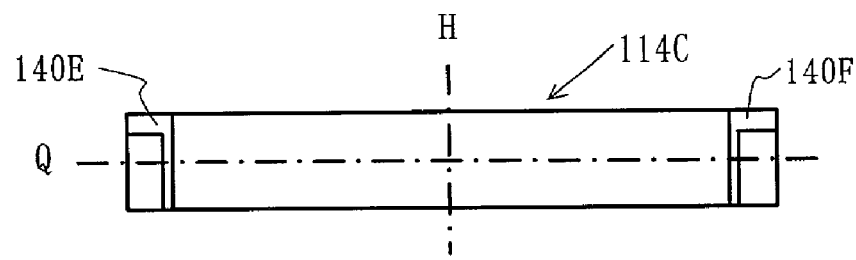
Figure 10:
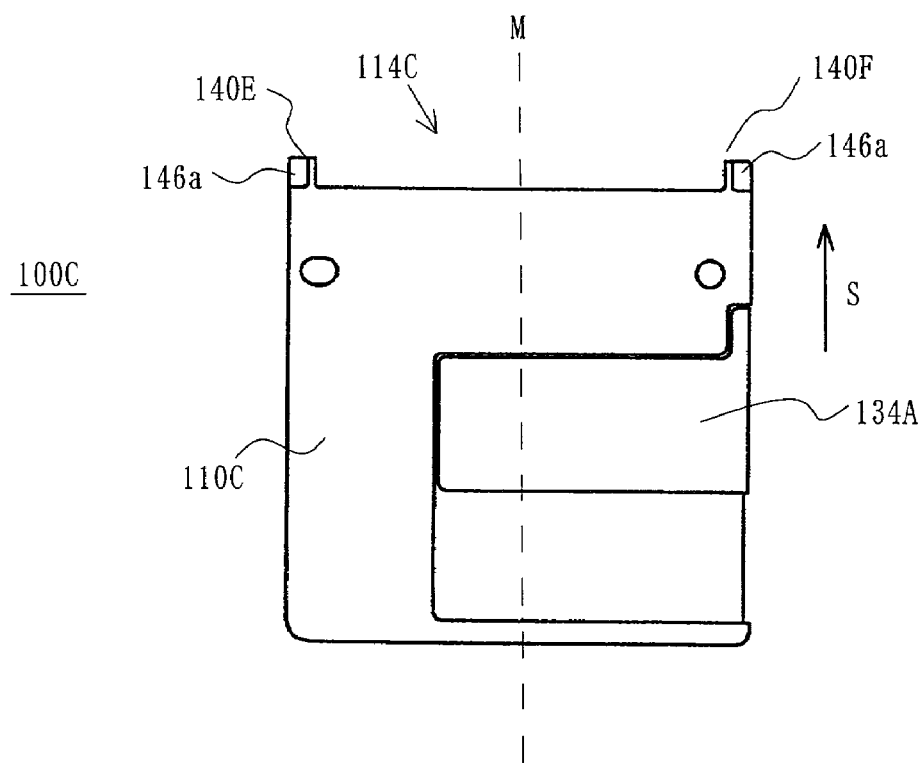
Figure 10:
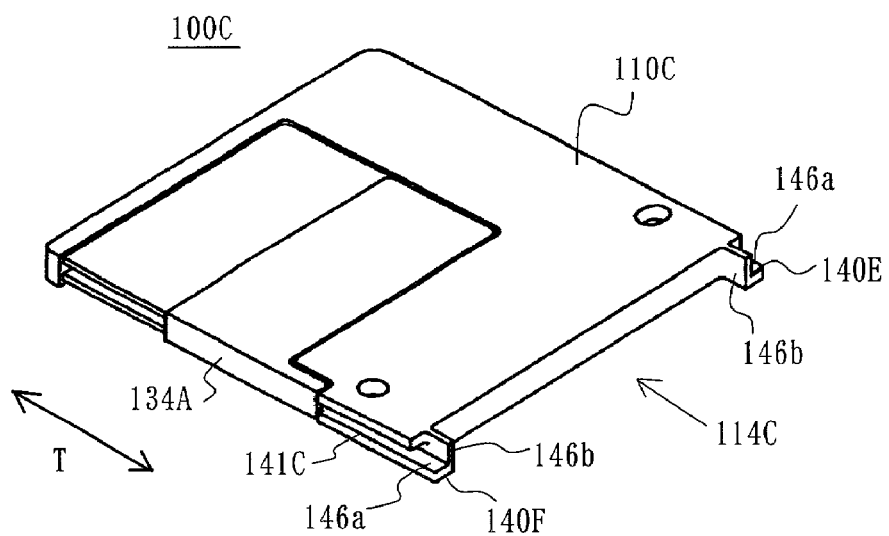

A description will now be given of a disk cartridge 100C of a fourth embodiment according to the present invention, with reference to FIG. 10. Here, FIG. 10(a) is a perspective view of an external appearance of the disk cartridge 100C at its front side. FIG. 10(b) is a front view of the disk cartridge 100C. FIG. 10(c) is a plane view of the disk cartridge 100C at its backside. FIG. 10(d) is a perspective view of an external appearance of the disk cartridge 100C at its backside.

The disk cartridge 100C includes a pair of different shaped projections 140E and 140F at both sides of a front surface 114C of a cartridge case (or shell) 110C. The projections 140E and 140F have an L shape, respectively, while the projection 140E is different from the projection 140F in that the projection 140F has a groove 141C at its center along the insertion direction S. The groove 141C is connected to a groove along which the shutter 134A moves.

As shown in FIGS. 10(c) and 10(d), the L shape of each of the projections 140E and 140F are formed by a horizontal part 146a and a perpendicular part 146b, opening to the outside. A pair of horizontal parts 146a are level with the surface of the shell 110C shown in FIG. 10(a). A pair of perpendicular parts 146b shift inwardly by a slight distance from the side surfaces of the shell 110C, respectively, and extend perpendicular to the horizontal parts 146a in the thickness direction of the shell 110C. Such shapes of the projections 140E and 140F prevent, as discussed later, the disk cartridge 100C from being erroneously inserted upside down into the inside of the disk drive 200C.

A necessary and sufficient length is selected for these projections 140E and 140F to unlock the lock member 230C, which will be described later: When the projection is too short, the lock member 230C becomes short accordingly; the lock member undesirably would possibly open even for a cartridge without the projection on impact and allow the cartridge to proceed to the inside of the disk drive. The projection if being too long would undesirably grow the cartridge large and reduce the mechanical strength of the projection. If necessary, these projections 140E and 140F have different shapes and sizes.

Referring to FIG. 10(b), the projections 140E and 140F are located at approximately symmetrical positions with respect to each of axes of symmetry Q and H of the front surface 114C. Thereby, when the cartridge 100C is pressed against a shutter 210C in a disk drive 200C, which will be described later, symmetrical forces with respect to the axes of symmetry Q and H apply to the shutter without causing deformation and damages of the shutter. In addition, the shape of the front surface 114C is different from that rotated by 180° due to the groove 141C and the projections 140E and 140F. The instant embodiment uses the projections 140E and 140F to prevent the cartridge 100C from being erroneously inserted upside down into the inside of the disk drive 200C.

Although the front surface 114C of the disk cartridge 100C is different from the front surface 114 in that the front surface 114C has a plane portion, the instant embodiment does not use this plane shape for unlock and other purposes.

Figure 11:
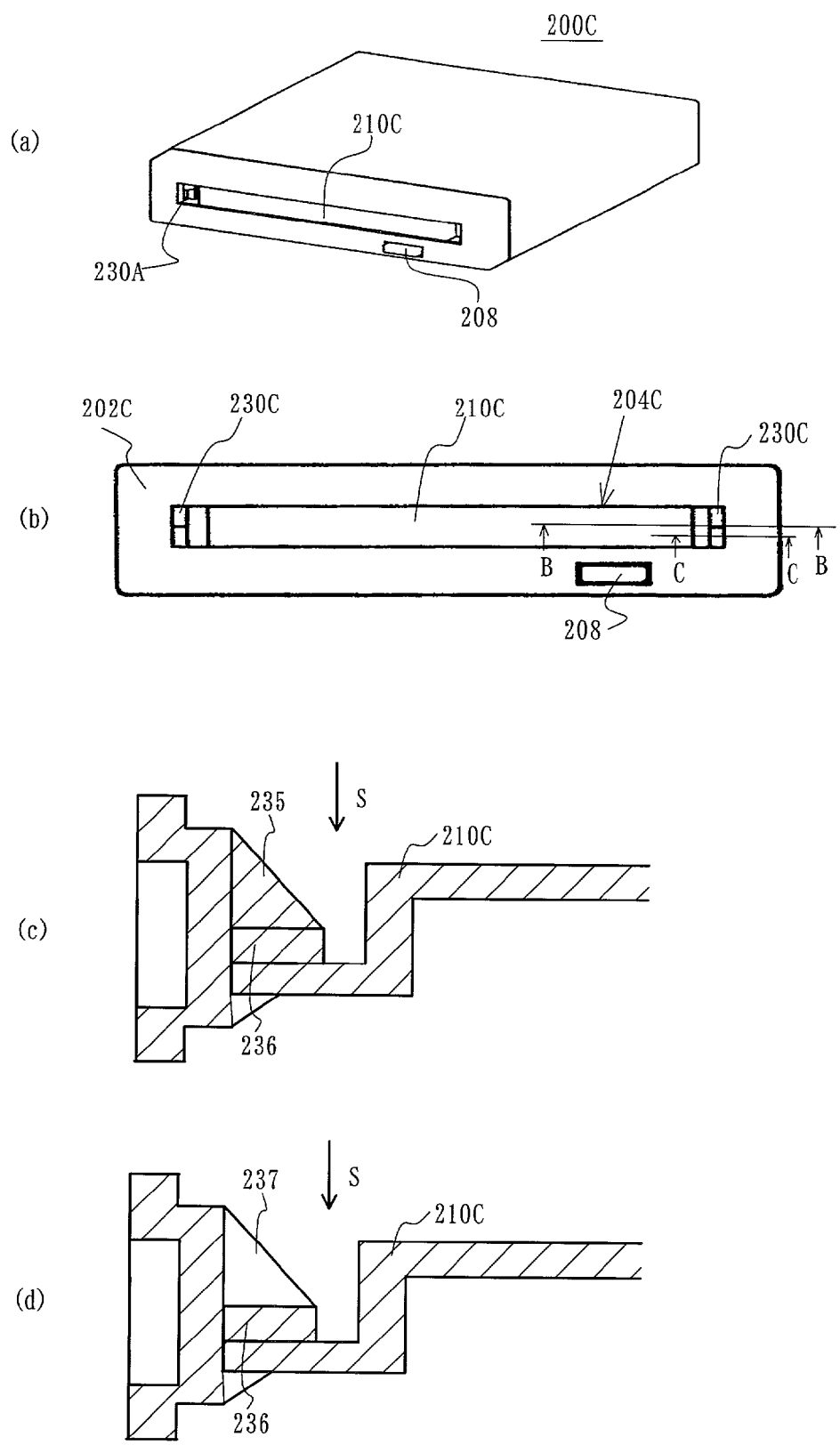
FIG. 11 is perspective, front, and partial sectional views of a disk drive fitted for the disk cartridge shown in FIG. 10.

A description will now be given of the disk drive 200C fitted for the disk cartridge 100C, with reference to FIG. 11. Here, FIG. 11(a) is a perspective view of an external appearance of the disk drive 200C, and FIG. 11(b) is a front view of the disk drive 200C. FIG. 11(c) is a sectional view taken along a line B—B in FIG. 11(b), and FIG. 11(d) is a sectional view taken along a line C—C in FIG. 11(b).

The disk drive 200C includes, as shown in FIGS. 11(a) and 11(b), an insertion opening 204C and an eject button 208 in an insertion part 202C. A shutter 210C is provided in the insertion opening 204C, and locked by a lock mechanism 220C. The lock mechanism 220C accommodates a lock member 230C and a spring 240C in a housing 222C. Since the housing 222C and the spring 240C are similar to the housing 222 and the spring 240, a description thereof will be omitted.

As shown in FIG. 11(c), the lock member 230C preferably retreats from a surface of the shutter 210C into the inside of the drive unit 200C. The lock member 230C, if projecting from the surface of the shutter 210C to the outside, may contact such a cartridge as does not have the projection: Such a cartridge would possibly unlock the lock member 230C on impact to the cartridge in the insertion direction S, and proceed to the inside of the disk drive 200C. The retreat amount of the lock member 230 is set by taking a length of each of the projections 140E and 140F into account.

As shown in FIG. 11(c), the lock member 230C is forced in the direction $L_2$ (or direction $L_1$ for the lock member 230C at the other side) to compress the shutter 210C by the spring 240C, and movable in the housing 222C. The disk cartridge 100C is inserted from the top in FIG. 11(c). FIG. 11(c) illustrates only one lock member 230C for convenience. This embodiment shapes the lock member 230C concavely and inserts the shutter 210C into the concave portion, while the shutter 210C may be shaped concavely instead, as shown in FIG. 2.

In front of the shutter 210C, the lock member 230C has a shape that combines a triangle column 235 with part of a rectangular parallelepiped 236, as shown in FIG. 11(c), at its upper half portion opposite to the cartridge 100C, and has the rest of the rectangular parallelepiped 236, as shown in FIG. 11(d), at its lower half portion opposite to the cartridge 100C. A space 237 is formed under the triangle column 235.

An operation of the disk cartridge 100C that is properly inserted into the disk drive 200C is similar to those described with reference to FIGS. 2, 4 and 6: As shown in FIGS. 12–16, when the disk cartridge 100C is properly inserted into the disk drive 200C, the shutter 210C allows the disk cartridge 100C to proceed.

Figure 12:
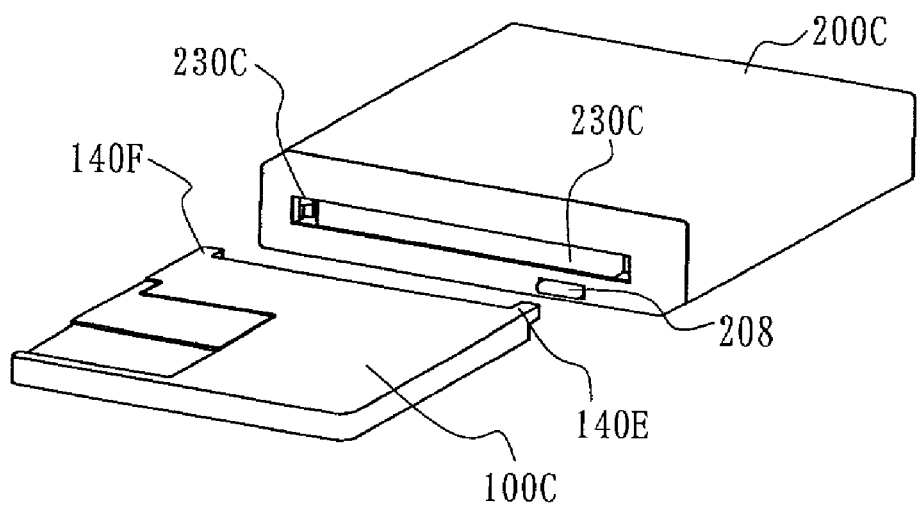
FIG. 12 is a perspective view of an external appearance of a system composed of the disk cartridge shown in FIG. 10 and the disk drive shown in FIG. 11.
Figure 13:
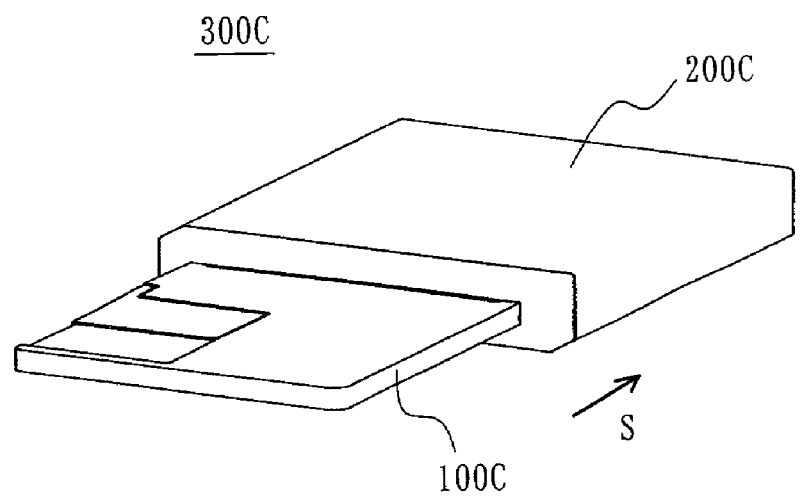
FIG. 13 is perspective and partial sectional views of a state where the disk cartridge shown in FIG. 10 is being inserted into an insertion opening in the disk drive shown in FIG. 11.
Figure 13:
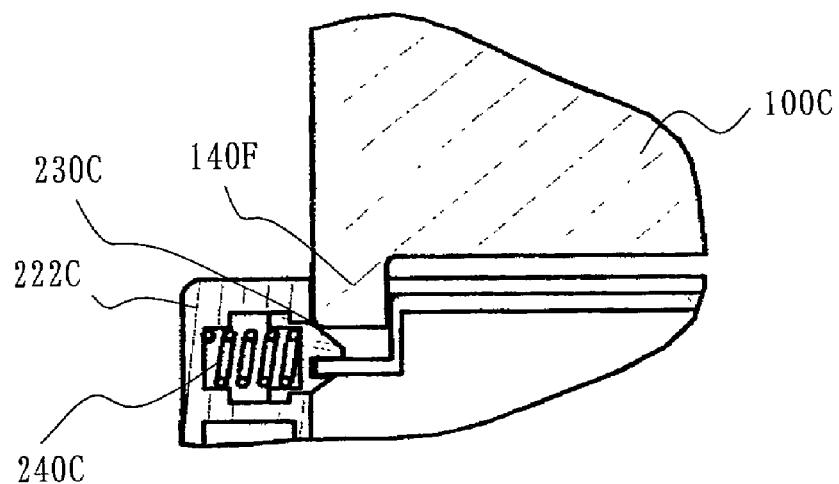
Figure 14:
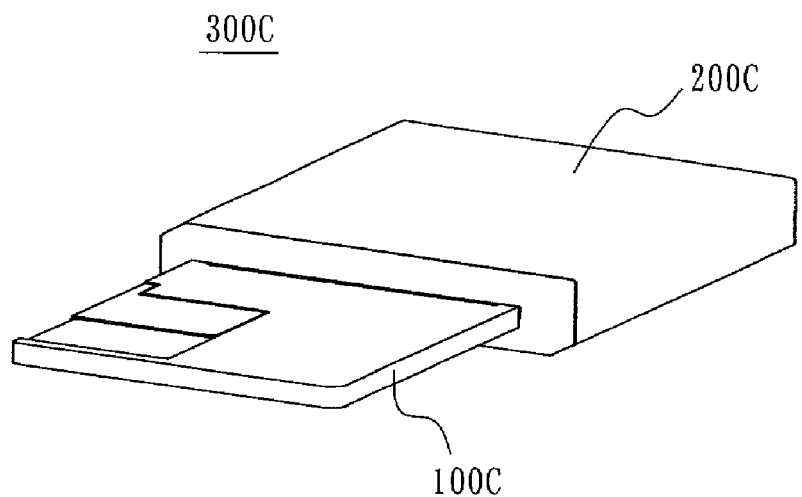
FIG. 14 is perspective and partial sectional views of a state where the disk cartridge proceeds farther to the inside of the disk drive than that shown in FIG. 13.
Figure 14:
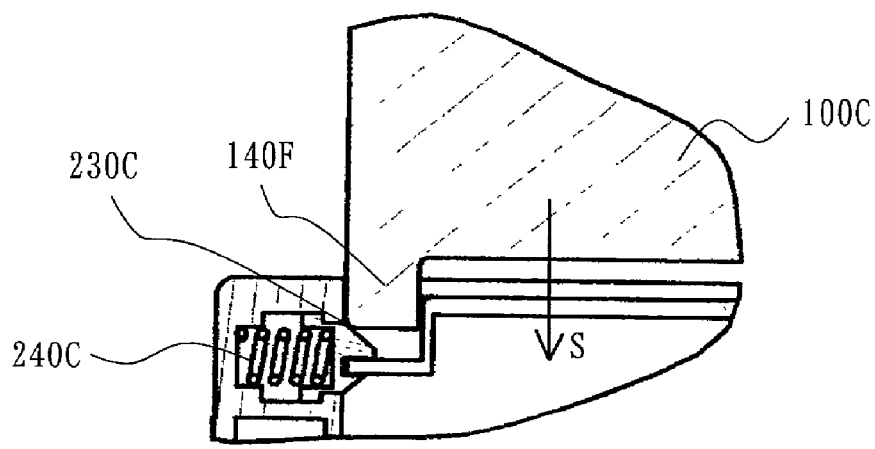
Figure 15:
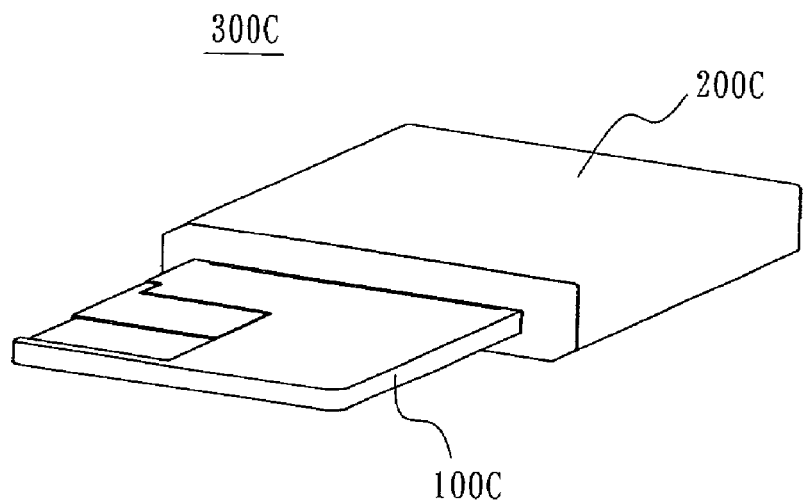
FIG. 15 is perspective and partial sectional views a state where the disk cartridge proceeds farther to the inside of the disk drive than that shown in FIG. 14.
Figure 15:
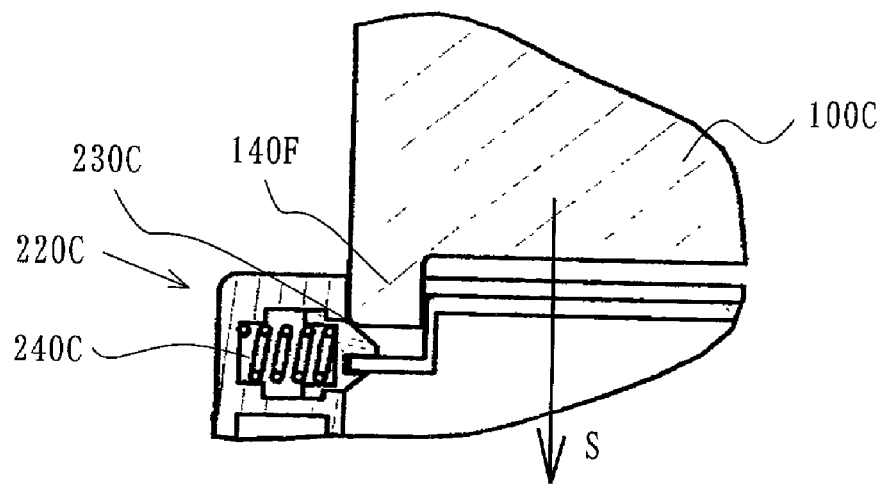

FIG. 12 is a perspective view of an external appearance of a system 300C including the disk cartridge 100C and the disk drive 200C. FIG. 13(a) is a perspective view of an external appearance of the disk cartridge 100C that is inserted into the insertion opening 204C after the state shown in FIG. 12. FIG. 13(b) is a sectional view a state where the projections 140E and 140F contact the lock members 230C at this time.

FIG. 14(a) is a perspective view of an external appearance of the disk cartridge 100C that proceeds farther in the insertion direction S than that shown in FIG. 13(a). FIG. 14(b) is a sectional view of a state at this time where the projections 140E and 140F release the lock to the shutter 210C by the lock members 230C. This unlock opens the shutter 210C as the front surface 114 of the cartridge case 110C moves farther.

FIG. 15(a) is a perspective view of an external appearance of the disk cartridge 100C that proceeds farther in the insertion direction S than that shown in FIG. 14(a). FIG. 15(b) is a sectional view of a state at this time where the projections 140E and 140F proceed to the inside of the disk drive 200C. In this state, the lock members 230C are accommodated in the housing 222C apart from the shutter 210C, the shutter 210C opens, and the disk cartridge 100C proceeds to the inside of the disk drive 200C.

In an attempt to insert a different type of cartridge into the disk drive 200C, the cartridge that does not have the projections 140E and 140F cannot unlock the lock members 230C, and cannot proceed to the inside of the disk drive 200C.

Figure 16:
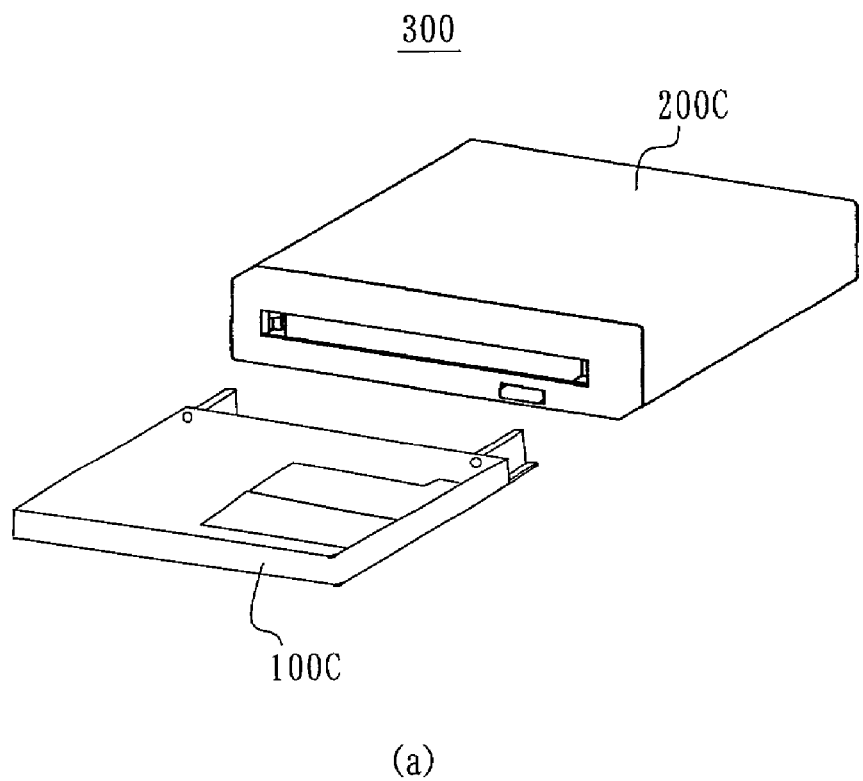
FIG. 16 is perspective and partial sectional views of a state where the disk cartridge shown in FIG. 10 is being erroneously inserted into the disk drive shown in FIG. 11.
Figure 16:
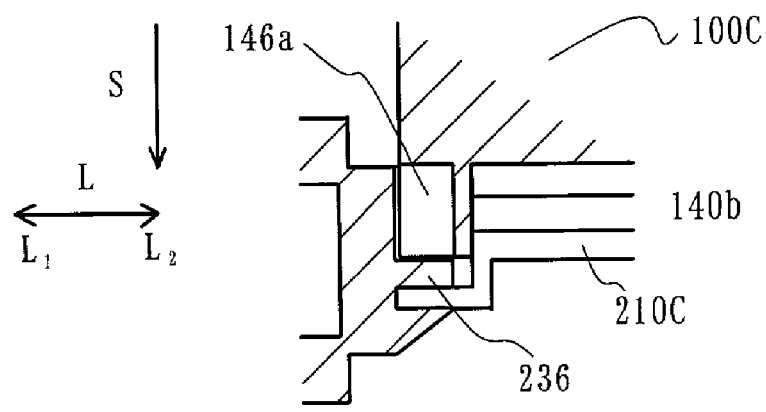

A description will now be given of an attempt to insert the disk cartridge 100C upside down into the disk drive 200C, with reference to FIGS. 10, 11 and 16. FIG. 16(a) is a perspective view of an external appearance of the disk cartridge 100C inserted upside down into the disk drive 200C. FIG. 16(b) is a sectional view, corresponding to FIG. 11(d), of the disk cartridge 100C inserted upside down.

In this state, as shown in FIGS. 11(d) and 16(b), the horizontal parts 146a in the projections 140E and 140F fall into the spaces 237 in the lock member 230C, and the perpendicular parts 146b stand next to the spaces 237 shown in FIG. 11(d). The triangle columns 235 do not contact the disk cartridge 100C. Therefore, no force apply to the lock member 230C in the direction $L_1$ in which it may go away from the shutter 210C (or the direction $L_2$ for the lock member 230C at the other side), but the lock member 230C is subject to only the force in the insertion direction S. Thus, the lock member 230C does not move. As a result, the cartridge 100C is blocked and unable to move in the insertion direction S after the projections 140E and 140F contact the lock members 230C, and the system 300C may prevent erroneous, upside down insertions of the cartridge 100C.

As in this embodiment, an effect of preventing erroneous insertions increases by shaping the projections 140E and 140F so that it becomes asymmetrical when the disk cartridge 100C is rotated by 180°, and providing the lock member 230C with a corresponding shape in the disk drive 200.

Figure 17:
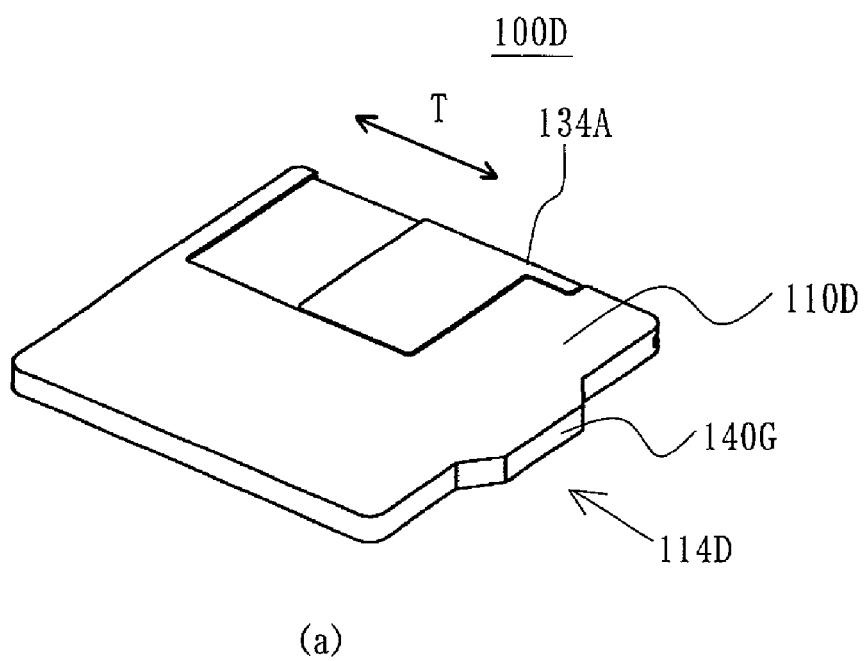
FIG. 17 is perspective, front and plane views of a disk cartridge of a fifth embodiment according to the present invention.
Figure 17:
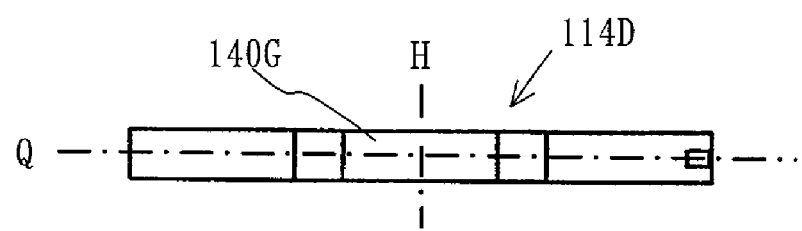
Figure 17:
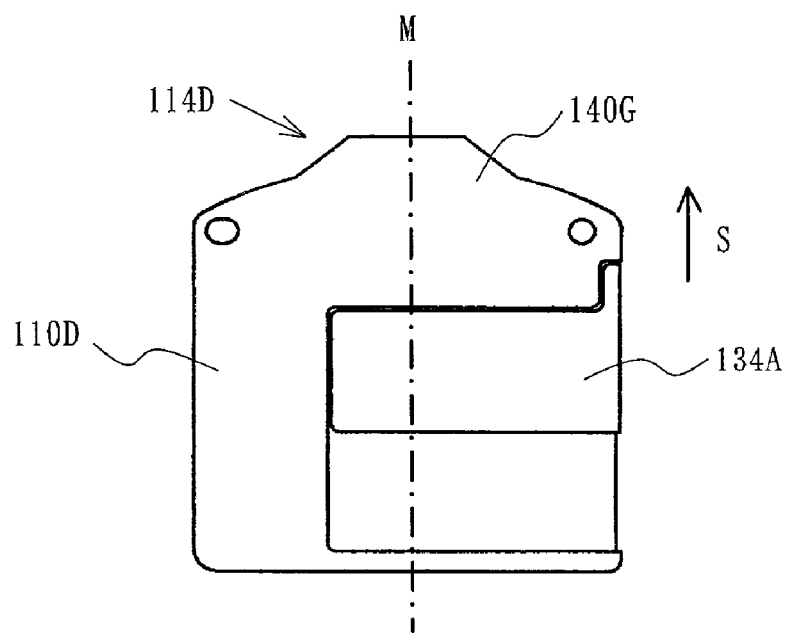
Figure 17:
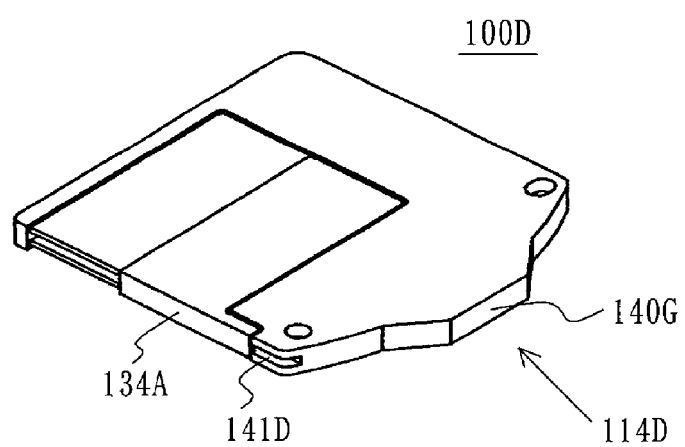

A description will now be given of a disk cartridge 100D of a fifth embodiment according to the present invention, with reference to FIG. 17. Here, FIG. 17(a) is a perspective view of an external appearance of the disk cartridge 100D at its front side. FIG. 17(b) is a front view of the disk cartridge 100D. FIG. 17(c) is a plane view of the disk cartridge 100D at its backside. FIG. 17(d) is a perspective view of an external appearance of the disk cartridge 100D at its backside.

The disk cartridge 100D includes one projection 140G at the center of a front surface 114D of a cartridge case (or shell) 110D. The projection 140G has a trapezoid section, and protrudes from the front surface 114D. A groove 141D is formed at the left side of the front surface 114D, and identifies both sides of the disk cartridge 100D. The groove 141D is connected to a groove along which the shutter 134A moves.

Referring to FIG. 17(b), the projection 140G is located at an approximately symmetrical position with respect to each of axes of symmetry Q and H of the front surface 114D. Thereby, when the cartridge 100D is pressed against a shutter (not shown) in a disk drive (not shown), symmetrical forces with respect to the axes of symmetry Q and H apply to the shutter without causing deformation and damages of the shutter. In addition, the shape of the front surface 114D is different from that rotated by 180° due to the groove 141D, whereby the cartridge 100D is prevented from being erroneously inserted upside down into the inside of the disk drive.

A necessary and sufficient length is selected for the projection 140G to unlock a lock member (not shown): When the projection is too short, the lock member becomes short accordingly; the lock member undesirably would possibly open even for a cartridge without the projection on impact and allow the cartridge to proceed to the inside of the disk drive. The projection if being too long would undesirably grow the cartridge large and reduce the mechanical strength of the projection.

Although the front surface 114D of the disk cartridge 100D is different from the front surface 114 in that the front surface 114D has a plane portion, the instant embodiment does not use this plane shape for unlock and other purposes.

Figure 18:
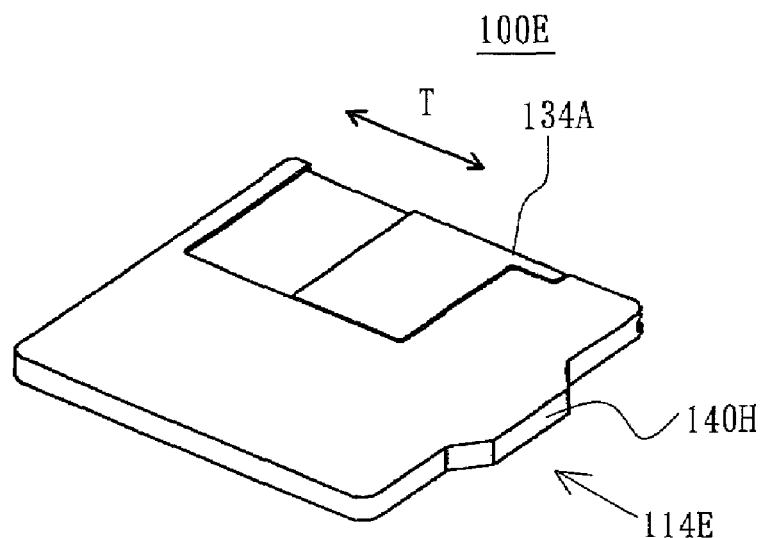
FIG. 18 is perspective, front and plane views of a disk cartridge of a sixth embodiment according to the present invention.
Figure 18:
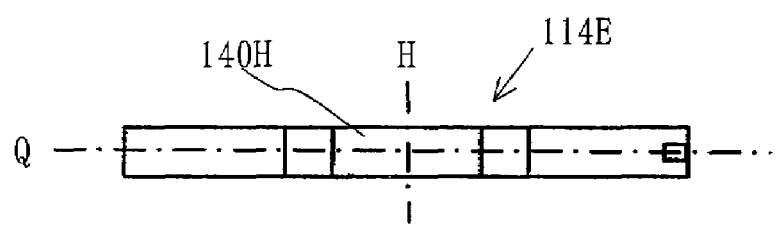
Figure 18:
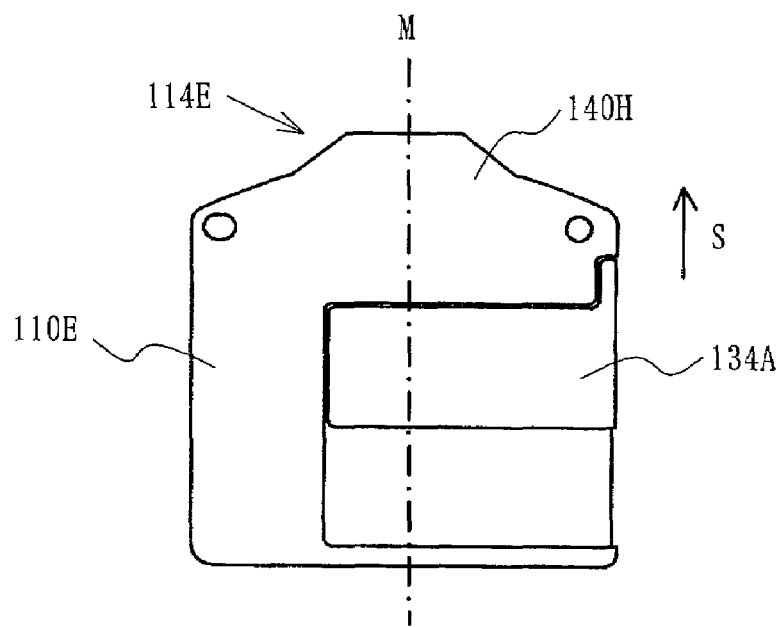
Figure 18:
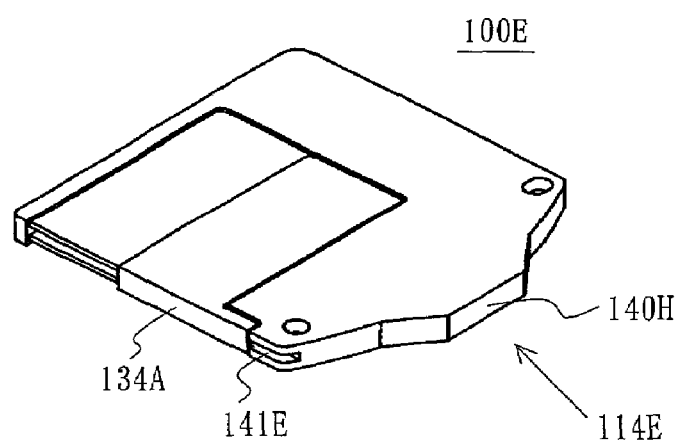

A description will now be given of a disk cartridge 100E of a sixth embodiment according to the present invention, with reference to FIG. 18. Here, FIG. 18(a) is a perspective view of an external appearance of the disk cartridge 100E at its front side. FIG. 18(b) is a front view of the disk cartridge 100E. FIG. 18(c) is a plane view of the disk cartridge 100E at its backside. FIG. 18(d) is a perspective view of an external appearance of the disk cartridge 100E at its backside.

The disk cartridge 100E includes one projection 140H at the center of a front surface 114E of a cartridge case (or shell) 110E. The projection 140H has a trapezoid section, and protrudes from the front surface 114E. A groove 141E is formed at the left side of the front surface 114E, and identifies both sides of the disk cartridge 100E. The groove 141E is connected to a groove along which the shutter 134A moves.

Referring to FIG. 18(b), the projection 140H is located at an approximately symmetrical position with respect to each of axes of symmetry Q and H of the front surface 114E. Thereby, when the cartridge 100E is pressed against a shutter (not shown) in a disk drive (not shown), symmetrical forces with respect to the axes of symmetry Q and H apply to the shutter without causing deformation and damages of the shutter. In addition, the shape of the front surface 114E is different from that rotated by 180° due to the groove 141E, whereby the cartridge 100E is prevented from being erroneously inserted upside down into the inside of the disk drive.

A necessary and sufficient length is selected for the projection 140H to unlock a lock member (not shown): When the projection is too short, the lock member becomes short accordingly; the lock member undesirably would possibly open even for a cartridge without the projection on impact and allow the cartridge to proceed to the inside of the disk drive. The projection if being too long would undesirably grow the cartridge large and reduce the mechanical strength of the projection.

Although the front surface 114E of the disk cartridge 100E is different from the front surface 114 in that the front surface 114E has a convex portion, the instant embodiment does not use this convex shape for unlock and other purposes.

Figure 19:
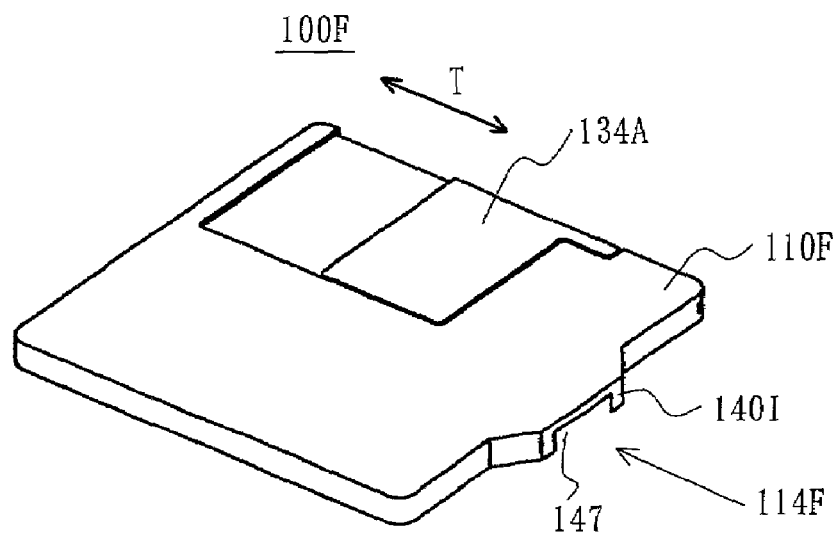
FIG. 19 is perspective, front and plane views of a disk cartridge of a seventh embodiment according to the present invention.
Figure 19:
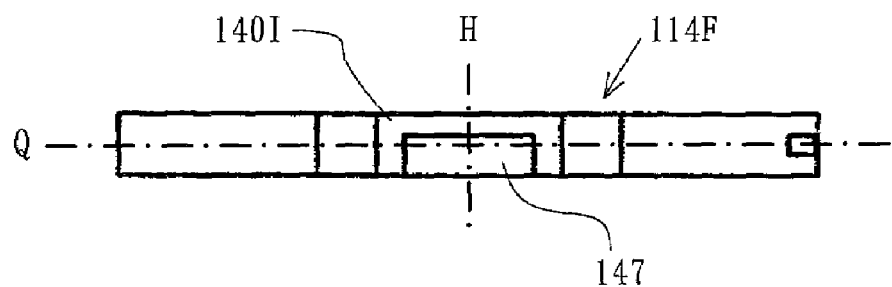
Figure 19:
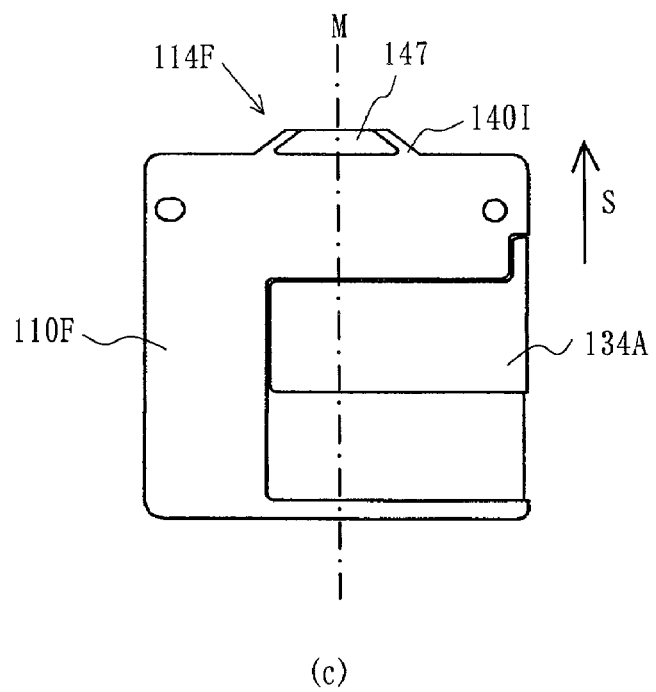
Figure 19:
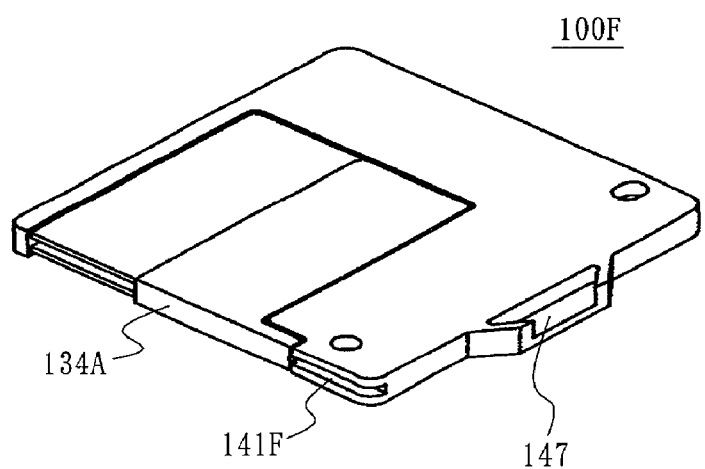

A description will now be given of a disk cartridge 100F of a seventh embodiment according to the present invention, with reference to FIG. 19. Here, FIG. 19(a) is a perspective view of an external appearance of the disk cartridge 100F at its front side. FIG. 19(b) is a front view of the disk cartridge 100F. FIG. 19(c) is a plane view of the disk cartridge 100F at its backside. FIG. 19(d) is a perspective view of an external appearance of the disk cartridge 100F at its backside.

The disk cartridge 100F includes one projection 140I at the center of a front surface 114F of a cartridge case (or shell) 110F. The projection 140H has a trapezoid section, and protrudes from the front surface 114F. A groove 141F is formed at the left side of the front surface 114F, and identifies both sides of the disk cartridge 100F. The groove 141F is connected to a groove along which the shutter 134A moves. A cutout 147 is formed at an approximately lower half of the projection 140I, and identifies both sides of the disk cartridge 100F. As shown in FIG. 19(C), the cutout 147 has a trapezoid section.

Referring to FIG. 19(b), the projection 140I is located at an approximately symmetrical position with respect to each of axes of symmetry Q and H of the front surface 114E. Thereby, when the cartridge 100F is pressed against a shutter 210F in a disk drive 200F, which will be described later, symmetrical forces with respect to the axes of symmetry Q and H apply to the shutter 210F without causing deformation and damages of the shutter 210F. In addition, a shape of the front surface 114F is different from that rotated by 180° due to the groove 141F and cutout 147. The instant embodiment uses the cutout 147 to prevent the cartridge 100F from being erroneously inserted upside down into the inside of the disk drive 200F.

A necessary and sufficient length is selected for the projection 140I to unlock a lock member 230F: When the projection is too short, the lock member becomes short accordingly; the lock member undesirably would possibly open even for a cartridge without the projection on impact and allow the cartridge to proceed to the inside of the disk drive. The projection if being too long would undesirably grow the cartridge large and reduce the mechanical strength of the projection.

Although the front surface 114F of the disk cartridge 100F is different from the front surface 114 in that the front surface 114F has a plane portion, the instant embodiment does not use this plane shape for unlock and other purposes.

Figure 20:
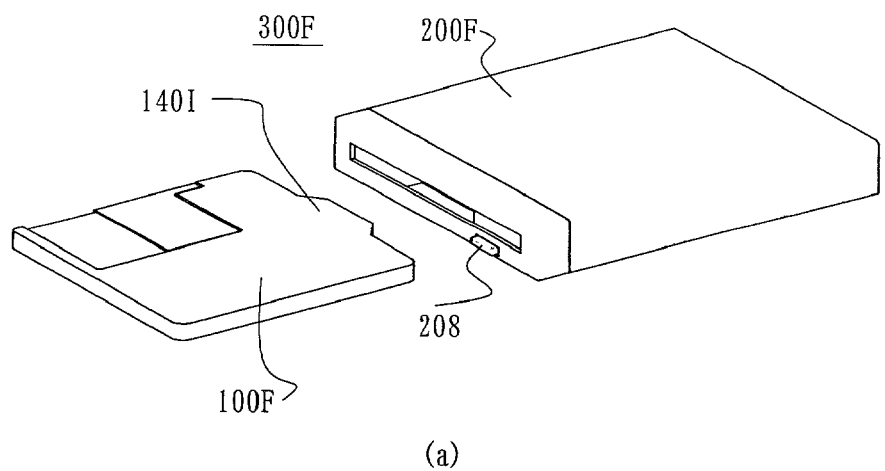
FIG. 20 is perspective, front, and partial sectional views of a system composed of the disk cartridge shown in FIG. 19 and a disk drive fitted for this disk cartridge.
Figure 20:
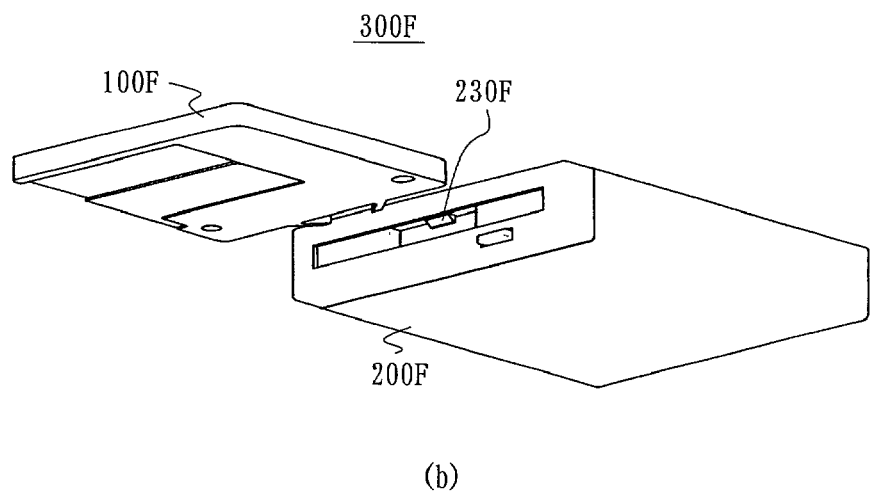
Figure 20:
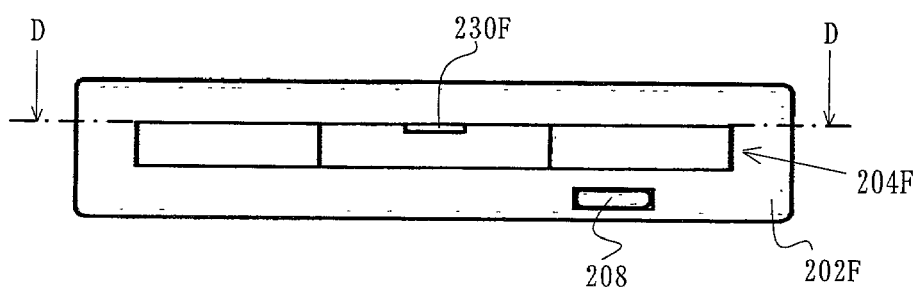
Figure 20:
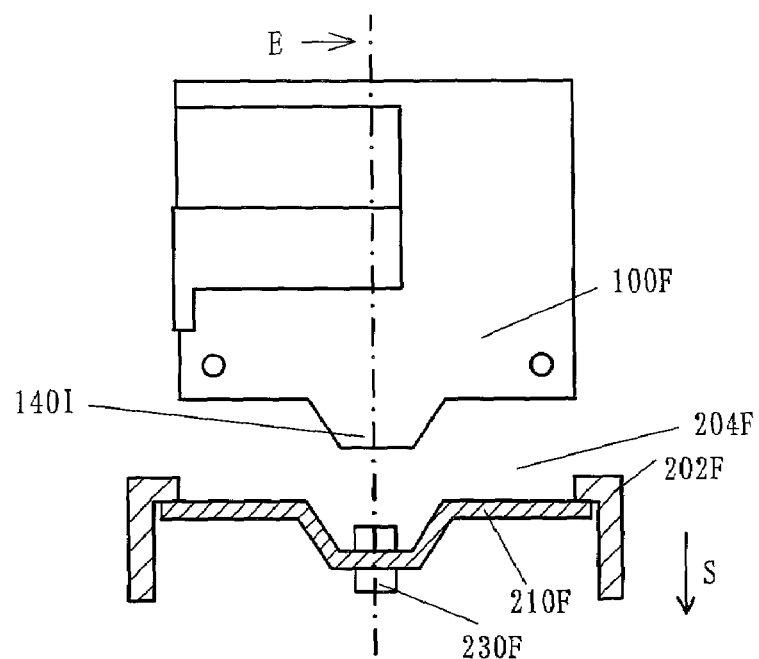
Figure 20:
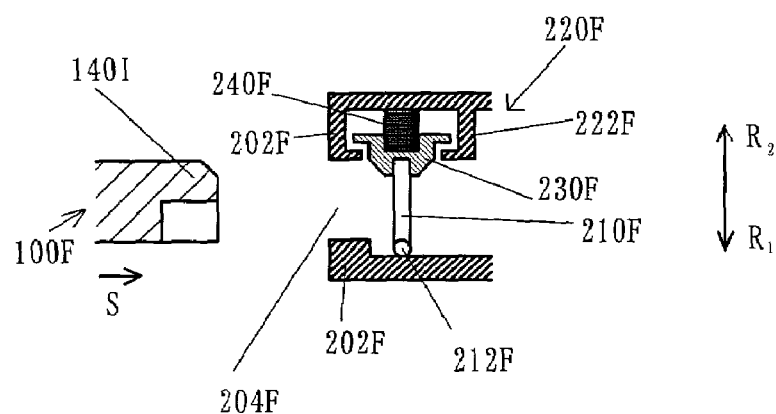

A description will now be given of the disk drive unit 200F fitted for the disk cartridge 200F, with reference to FIGS. 20 through 24. FIG. 20(a) is a perspective view of an external appearance of a system 300F viewed from the top including the disk cartridge 100F and the disk drive 200F fitted for it. FIG. 20(b) is a perspective view of an external appearance of the system 300F viewed from the bottom. FIG. 20(c) is a front view of the disk drive 200F. FIG. 20(d) is a sectional view taken along a line D—D in FIG. 20(c). FIG. 20(e) is a sectional view taken along a line E—E in FIG. 20(d).

The disk drive 200F includes, as shown in FIGS. 20(b) and 20(c), an insertion opening 204F and the eject button 208 in an insertion part 202F. The shutter 210F is provided in the insertion opening 204F, and locked by the lock mechanism 220F provided at the upper center. The lock mechanism 220F accommodates a lock member 230F and a spring 240F in a housing 222F. Since the housing 222F and the spring 240F are similar to the housing 222 and the spring 240, a description thereof will be omitted.

As shown in FIGS. 20(b) and 20(d), the shutter 210F has a concave shape in which a center retreats form its both ends by a predetermined distance. In other words, the lock member 230F retreats from a surface of the shutter 210F into the inside of the drive unit 200F. The lock member 230F, if projecting from the surface of the shutter 210F to the outside, may contact such a cartridge as does not have the projection: Such a cartridge would possibly unlock the lock member 230F on impact to the cartridge in the insertion direction S, and proceed to the inside of the disk drive 200F. The retreat amount of the lock member 230F is set by taking a length of the projection 140I into account.

As shown in FIG. 20(e), the lock member 230F is forced in a direction $R_1$ to compress the shutter 210F by the spring 240F, and movable in the housing 222F. This embodiment shapes the lock member 230F concavely and inserts the shutter 210F into this concave portion, while the shutter 210F may be shaped concavely instead, as shown in FIG. 2. Thus, the lock member 230F locks the shutter 210F from the top in this embodiment.

Figure 21:
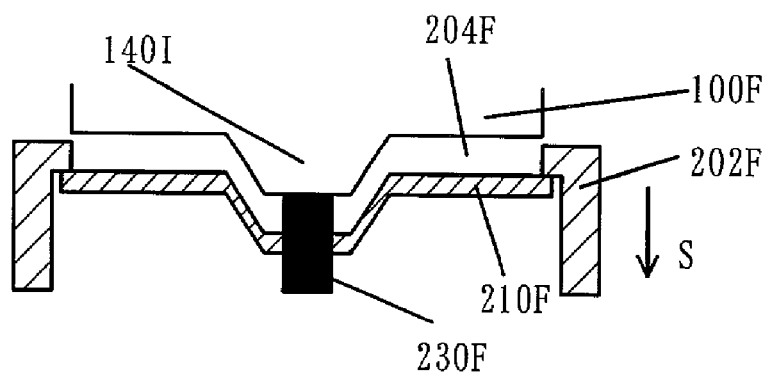
FIG. 21 is perspective and partial sectional views of a state where the disk cartridge shown in FIG. 19 is being inserted into an insertion opening in the disk drive shown in FIG. 20.
Figure 21:
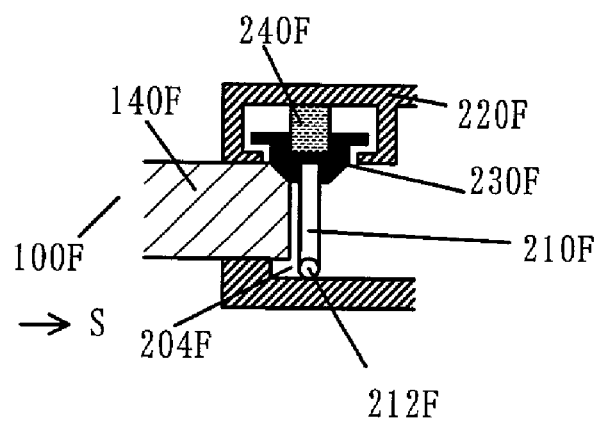
Figure 22:
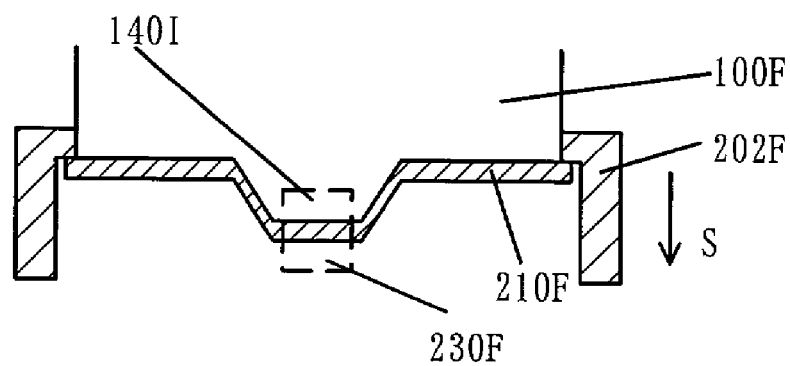
FIG. 22 is perspective and partial sectional views of a state where the disk cartridge proceeds farther to the inside of the disk drive than that shown in FIG. 21.
Figure 22:
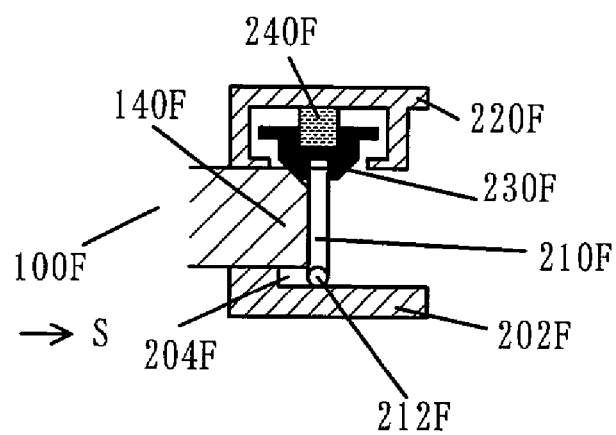
Figure 23:
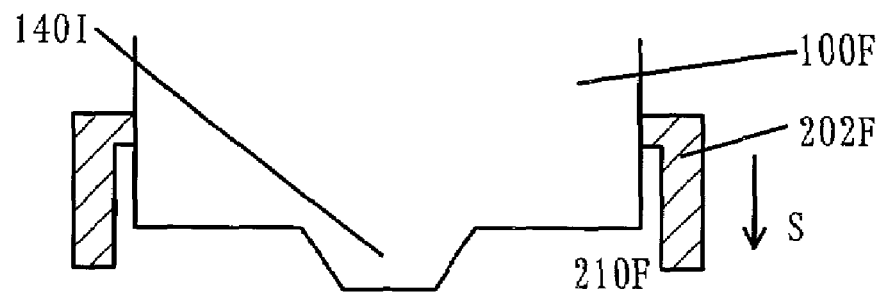
FIG. 23 is perspective and partial sectional views of a state where the disk cartridge proceeds farther to the inside of the disk drive than that shown in FIG. 22.
Figure 23:
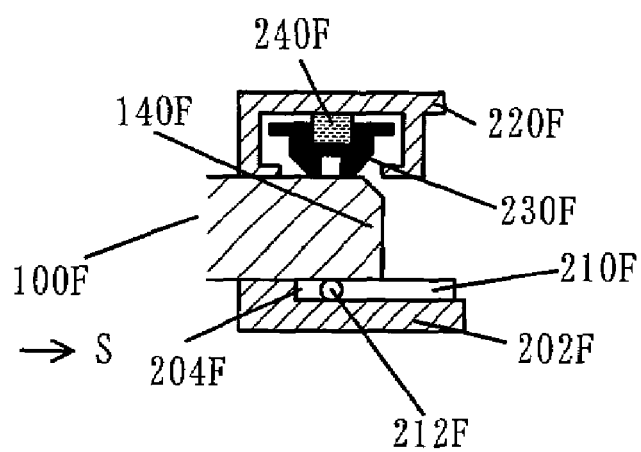

An operation of the disk cartridge 100F to be properly inserted into the disk drive 200F is similar to those described with reference to FIGS. 2, 4 and 6, except that the lock member 230F retreats in a direction $R_2$: As shown in FIGS. 21–23, when the disk cartridge 100F is properly inserted into the disk drive 200F, the shutter 210F allows the disk cartridge 100F to proceed.

FIGS. 21(a) and 21(b) are sectional views of the disk cartridge 100F that has proceeded farther in the insertion direction S than that shown in FIG. 20(c), and the projection 140I contacts the lock member 230.

FIGS. 22(a) and 22(b) are sectional views of the disk cartridge 100F that has proceeded farther in the insertion direction S than that shown in FIGS. 21(a) and 21(b), and the projection 140I opens the lock to the shutter 210F by the lock members 230F. This unlock opens the shutter 210F as the front surface 114F of the cartridge case 110F moves farther.

FIGS. 23(a) and 23(b) are sectional views of the disk cartridge 100F that has proceeded farther in the insertion direction S than that shown in FIGS. 22(a) and 22(b), and the projection 140I proceeds to the inside of the disk drive 200F. In this state, the lock member 230C is accommodated in the housing 222F apart from the shutter 210F, the shutter 210F opens, and the disk cartridge 100F proceeds to the inside of the disk drive 200F.

In an attempt to insert a different type of cartridge into the disk drive 200F, the cartridge that does not have the projection 140I cannot unlock the lock member 230F, and cannot proceed to the inside of the disk drive 200F.

Figure 24:
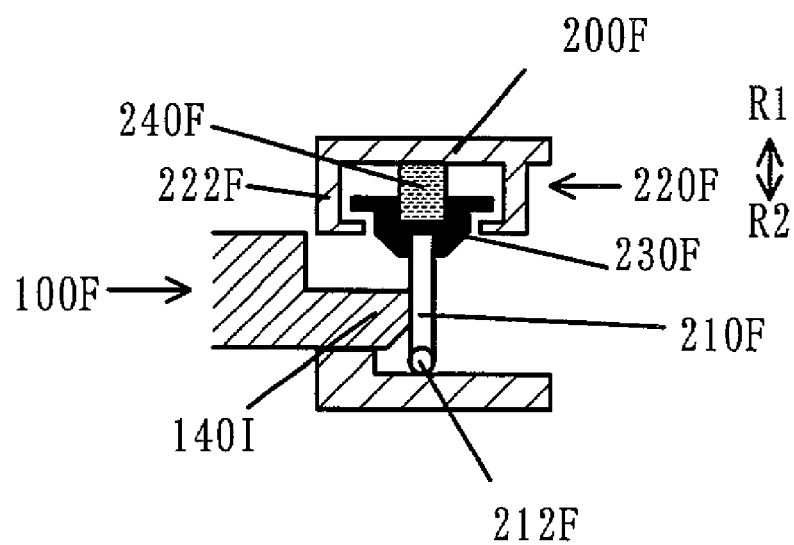
FIG. 24 is a sectional view of a state where the disk cartridge shown in FIG. 19 is being inserted upside down into the disk drive shown in FIG. 20 and contacts a shutter.

A description will now be given of an attempt to insert the disk cartridge 100F upside down into the disk drive 200F, with reference to FIG. 24. FIG. 24 is a sectional view showing that the disk cartridge 100F inserted upside down and contacts the shutter 210F.

In this state shown in FIG. 24, since the cutout 147 in the projection 140I does not contact the lock member 230F, no force apply to the lock member 230F in the direction $R_2$ in which it may go away from the shutter 210F and the lock member 230F does not move in the direction $R_2$. As a result, the cartridge 100F is blocked and unable to move in the insertion direction S farther after contacting the shutter 210F, and the system 300F may prevent erroneous, upside-down insertions of the cartridge 100F.

As in this embodiment, an effect of preventing erroneous insertions is enhanced by shaping the projection 140I so that it becomes asymmetrical when the disk cartridge 100F is rotated by 180°, and by providing the lock member 230C with a corresponding shape in the disk drive 200.

Further, the present invention is not limited to these preferred embodiments, and various variations and modifications may be made without departing from the scope of the present invention. For example, the present invention is generally applicable to an electronic apparatus that may accommodate a unit. The groove 114A etc., may serve to prevent erroneous, upside-down insertions. Moreover, although the instant embodiments describe that the projection on the cartridge mechanically engages with the lock mechanism, the lock mechanism may be electric, electronic, magnetic and other mechanisms or a combination of them; for example, it may use a sensor, a solenoid, and the like.

Thus, the present invention provides a cartridge, its drive unit, and a system including them which promptly identifies the fitness of the cartridge to the drive unit, prevents the erroneous insertions of the cartridge, and protecting the cartridge and the drive unit from getting damaged. In particular, as discussed above, since the instant embodiments provide both of a cartridge and its drive unit with an erroneous insertion prevention mechanism against another type of disk cartridge, it is possible to determine at the beginning of the insertion the presence of the erroneous insertion, and to prevent erroneous insertions of another type of disk cartridge without fail using a projection protruding from the front surface of the cartridge case in the insertion direction. Thereby, the disk cartridge and the disk drive are effectively prevented from colliding with each other and getting damaged.

What is claimed is:

1. A cartridge for accommodating an information recording medium to be driven by a drive unit that has an insertion opening into which said cartridge is inserted, the drive unit including a lid which opens and closes the insertion opening, and a mechanism for locking a close state of the lid so as to prohibit another cartridge of a type different from said cartridge and said cartridge not facing a predetermined direction from proceeding to an inside of the drive unit, and for unlocking the closed state so as to allow the cartridge to proceed to the inside of the drive unit, said cartridge comprising a front surface that is first inserted into the insertion opening and an unlock member which unlocks the locked state of the lid in cooperation with the mechanism when said cartridge is inserted into said drive unit wherein said unlock member includes two projections that extend from said front surface in an insertion direction of said cartridge into the drive unit for unlocking the locking state of the lid in advance to the insertion of the front surface, one of said projections containing a groove, and wherein said cartridge further comprises a lid that moves along the groove while opening and closing the information recording medium.

2. A cartridge according to claim 1, wherein said front surface includes at least one axis of symmetry when said cartridge is viewed from a front of said cartridge, and said unlock member includes at least two differently shaped projections located at approximate symmetry with respect to the axis of symmetry.

3. A cartridge according to claim 1, wherein there are a plurality of unlock members each having at least one projection located symmetrically with respect to a centerline of said cartridge parallel to the insertion direction.

4. A cartridge according to claim 1, wherein said front surface has a curved portion.

5. A cartridge according to claim 1, wherein said front surface has a convex portion.

6. A cartridge according to claim 1, wherein said projection is provided at a center part of said front surface.

7. A cartridge according to claim 1, wherein said unlock member includes a plurality of projections on said front surface.

* * * * *

UNITED STATES PATENT AND TRADEMARK OFFICE
CERTIFICATE OF CORRECTION

| | | |
|---|---|---|
| PATENT NO. | : 7,032,234 B2 | Page 1 of 1 |
| APPLICATION NO. | : 09/962091 | |
| DATED | : April 18, 2006 | |
| INVENTOR(S) | : Katsusuke Shimazaki et al. | |

It is certified that error appears in the above-identified patent and that said Letters Patent is hereby corrected as shown below:

Assignee Name:

*At (73) Assignee should read* --Hitachi Maxell, Ltd.--

Signed and Sealed this

Eighth Day of August, 2006

JON W. DUDAS
*Director of the United States Patent and Trademark Office*